(12) United States Patent
Kazariya et al.

(10) Patent No.: US 11,180,634 B2
(45) Date of Patent: *Nov. 23, 2021

(54) RUBBER COMPOSITION FOR TIRE, AND PNEUMATIC TIRE

(71) Applicant: THE YOKOHAMA RUBBER CO., LTD., Tokyo (JP)

(72) Inventors: Ayaki Kazariya, Hiratsuka (JP); Makoto Ashiura, Hiratsuka (JP); Satoshi Mihara, Hiratsuka (JP); Kazushi Kimura, Hiratsuka (JP); Hirokazu Kageyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 16/646,340

(22) PCT Filed: Sep. 10, 2018

(86) PCT No.: PCT/JP2018/033503
§ 371 (c)(1),
(2) Date: Mar. 11, 2020

(87) PCT Pub. No.: WO2019/054340
PCT Pub. Date: Mar. 21, 2019

(65) Prior Publication Data
US 2020/0270420 A1     Aug. 27, 2020

(30) Foreign Application Priority Data

Sep. 13, 2017   (JP) ............................ JP2017-175967

(51) Int. Cl.
| C08K 5/3462 | (2006.01) |
| B60C 1/00 | (2006.01) |
| C08K 5/3432 | (2006.01) |
| C08K 5/372 | (2006.01) |

(52) U.S. Cl.
CPC .......... *C08K 5/3462* (2013.01); *B60C 1/0016* (2013.01); *C08K 5/3432* (2013.01); *C08K 5/3725* (2013.01); *C08K 2201/006* (2013.01)

(58) Field of Classification Search
CPC .. C08K 5/3432; C08K 5/3462; C08K 5/3725; B60C 1/0016
See application file for complete search history.

(56) References Cited

U.S. PATENT DOCUMENTS

| 2014/0364560 A1 | 12/2014 | Backer et al. | |
| 2015/0306912 A1* | 10/2015 | Darnaud | C08K 3/04 524/100 |

FOREIGN PATENT DOCUMENTS

JP       2015-502357 A      1/2015

* cited by examiner

*Primary Examiner* — Vickey Nerangis
(74) *Attorney, Agent, or Firm* — Carrier Blackman & Associates, P.C.; Joseph P. Carrier; Anne G. Sabourin

(57) ABSTRACT

The present invention provides a rubber composition for a tire, the rubber composition containing: a diene rubber; silica; and a heterocyclic compound (where, the heterocyclic compound does not have a silicon atom) having a hydrocarbon group having from 3 to 30 carbons and at least one type of heterocycle selected from the group consisting of a piperazine ring, a morpholine ring, and a thiomorpholine ring; an average glass transition temperature of the diene rubber being −50° C. or higher; a content of the silica being from 80 to 200 parts by mass per 100 parts by mass of the diene rubber; and a content of the heterocyclic compound being from 0.5 to 20% by mass with respect to the content of the silica. Such rubber composition has excellent processability, exhibits excellent wet grip performance and has low rolling resistance when the rubber composition is formed into a tire.

15 Claims, 1 Drawing Sheet

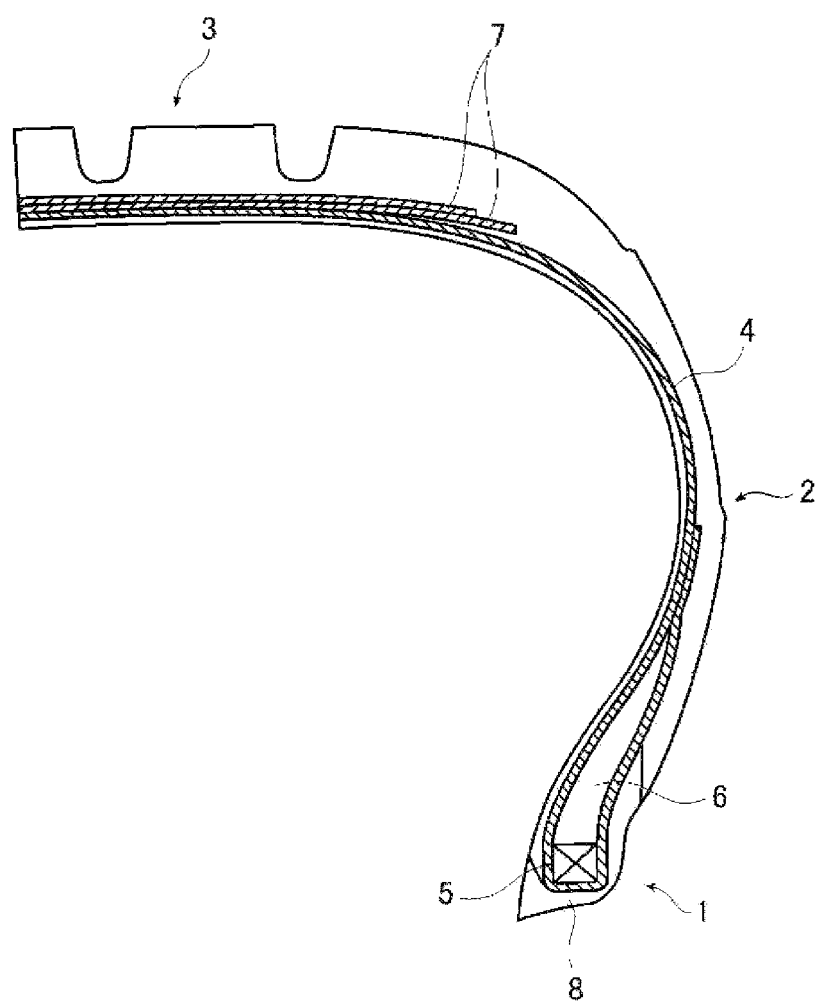

RUBBER COMPOSITION FOR TIRE, AND PNEUMATIC TIRE

TECHNICAL FIELD

The present invention relates to a rubber composition for a tire, and a pneumatic tire.

BACKGROUND ART

Conventionally, there has been a demand to reduce tire rolling resistance from the perspective of low fuel consumption at the time of vehicle traveling. In addition, there has been a demand for enhancement in wet grip performance (braking performance on wet road surfaces) from the perspective of safety. For these, a method of providing low rolling resistance and wet grip performance in a compatible manner by blending silica to a rubber component constituting the tread portion of a tire has been known.

Furthermore, in recent years, for demands for providing higher performance to tires, a technique that uses silica having a large specific surface area has been known.

However, silica has low affinity with rubber components, and the cohesiveness between silica components is high, so if silica is simply blended to the rubber component, the silica is not dispersed, which leads to the problem that the effect of reducing the rolling resistance or the effect of enhancing the wet grip performance cannot be sufficiently achieved.

Therefore, to enhance the dispersion of silica in a rubber composition, a method of adding a sulfur-containing silane coupling agent, such as a sulfide-based silane coupling agent or a mercapto-based silane coupling agent, has been known.

Meanwhile, as a rubber composition containing a coupling agent for an inorganic filler and an elastomer, for example, Patent Document 1 describes a diene elastomer composition containing a diene elastomer, a hydrolyzable silane, and a curing agent for the diene elastomer, and the hydrolyzable silane being a hydrolyzable silane having a particular structure.

CITATION LIST

Patent Literature

Patent Document: JP 2015-502357 T

SUMMARY OF INVENTION

Technical Problem

However, when a large amount of silica having a large specific surface area is blended into a rubber composition containing a diene rubber and a sulfur-containing silane coupling agent, effect caused by silica blending can be expected. However, silica tends to aggregate, and problems such as reduction in effect and deterioration in processability (e.g. the Mooney viscosity of an unvulcanized rubber composition is increased) tends to occur.

Furthermore, in some cases, the low rolling resistance or the wet grip performance of a rubber obtained by such a rubber composition does not satisfy the level that is required recently (Standard Example in each table of Examples below).

Furthermore, as a result of preparing a rubber composition containing a hydrolyzable silane having a piperazine ring by referring to Patent Document 1 and evaluating the prepared rubber composition, the present inventors have found that such a composition has a high Mooney viscosity and cannot prevent scorch (burning of unvulcanized rubber), and may have low processability. Furthermore, it was found that, in the composition described above, the hydrolyzable silane may achieve only little effects of low rolling resistance or wet grip performance (Comparative Example 4 of each table).

An object of the present invention is to provide a rubber composition for a tire that has excellent processability (e.g. the Mooney viscosity is in an appropriate range) and that exhibits excellent wet grip performance and low rolling resistance when the rubber composition is formed into a tire, and to provide a pneumatic tire including the rubber composition for a tire.

Solution to Problem

As a result of diligent research to solve the problems described above, the inventors of the present invention found that a heterocyclic compound having a particular structure has effect on processability as well as effect on wet grip performance and low rolling resistance.

Furthermore, the inventors of the present invention also found that the problems described above can be solved by blending a particular content of the heterocyclic compound in the case where the average glass transition temperature of a diene rubber and the content of silica are in predetermined ranges, and thus completed the present invention.

Specifically, the present invention can solve the problems described above by the following features.

[1] A rubber composition for a tire, the rubber composition containing:
a diene rubber;
silica; and
a heterocyclic compound (where, the heterocyclic compound does not have a silicon atom) having a hydrocarbon group having from 3 to 30 carbons and at least one type of heterocycle selected from the group consisting of a piperazine ring, a morpholine ring, and a thiomorpholine ring,
an average glass transition temperature of the diene rubber being −50° C. or higher,
a content of the silica being from 80 to 200 parts by mass per 100 parts by mass of the diene rubber, and
a content of the heterocyclic compound being from 0.5 to 20% by mass with respect to the content of the silica.

[2] The rubber composition for a tire according to [1] above, where the heterocyclic compound is a compound represented by Formula (I) below.

[Chemical Formula 1]

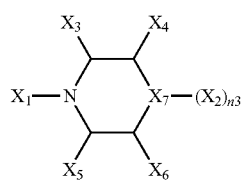

(I)

In Formula (I), $X_7$ represents at least one type selected from the group consisting of a nitrogen atom, an oxygen atom, and a sulfur atom, $X_3$, $X_4$, $X_5$, and $X_6$ each independently represent a hydrogen atom or a hydrocarbon group.

When $X_7$ is a nitrogen atom, n3 is 1, and one or both of $X_1$ and $X_2$ each independently represent Formula (I-1): -$(A_1)_{n1-1}$-$R_{1-1}$, when only one of $X_1$ and $X_2$ represents Formula (I-1), the remaining groups represent at least one type selected from the group consisting of a hydrogen atom, a sulfone-based protecting group, a carbamate-based protecting group, and Formula (I-3): —$(R_2$—$O)_{n2}$—H, in Formula (I-3), $R_2$ each independently represents a divalent hydrocarbon group, and n2 represents from 1 to 10.

When $X_7$ is at least one type selected from the group consisting of an oxygen atom and a sulfur atom, n3 represents 0, and $X_1$ represents Formula (I-1): -$(A_1)_{n1-1}$-$R_{1-1}$.

In Formula (I-1), $A_1$ represents at least one type selected from the group consisting of a carbonyl group and Formula (I-2): —$R_{1-2}$(OH)—O—, n1-1 represents 0 or 1, $R_{1-1}$ represents a hydrocarbon group having from 3 to 30 carbons, and in Formula (I-2), $R_{1-2}$ represents a trivalent hydrocarbon group.

[3] The rubber composition for a tire according to [2] above, where the heterocyclic compound is a compound represented by Formula (I) above, where $X_7$ is a nitrogen atom, n3 is 1, and both of $X_1$ and $X_2$ each independently represent Formula (I-1) above.

[4] The rubber composition for a tire according to [2] above, where the heterocyclic compound is a compound represented by Formula (I) above, where $X_7$ is a nitrogen atom, and n3 is 1, only one of $X_1$ and $X_2$ represents Formula (I-1) above, the remaining groups represent at least one type selected from the group consisting of a hydrogen atom, a sulfone-based protecting group, a carbamate-based protecting group, and Formula (I-3): —$(R_2$—$O)_{n2}$—H. In Formula (I-3), $R_2$ each independently represents a divalent hydrocarbon group, and n2 represents from 1 to 10.

[5] The rubber composition for a tire according to any one of [1] to [4] above, where the silica has a CTAB adsorption specific surface area of 150 to 300 $m^2/g$.

[6] The rubber composition for a tire according to any one of [1] to [5] above, the rubber composition further containing a silane coupling agent.

[7] The rubber composition for a tire according to any one of [1] to [6] above, where the diene rubber contains a modified diene rubber, and a content of the modified diene rubber is greater than 50% by mass with respect to a total amount of the diene rubber.

[8] The rubber composition for a tire according to any one of [1] to [7] above, the rubber composition further containing a low molecular weight conjugated diene polymer that has a weight average molecular weight of 1000 to 30000 and that may be modified, a content of the low molecular weight conjugated diene polymer being from 5 to 30 parts by mass per 100 parts by mass of the diene rubber.

[9] A pneumatic tire including the rubber composition for a tire described in any one of [1] to [8] above in a cap tread.

Advantageous Effects of Invention

The rubber composition for a tire according to an embodiment of the present invention has excellent processability and exhibits excellent wet grip performance and low rolling resistance when the rubber composition is formed into a tire.

In addition, the present invention can provide the pneumatic tire.

BRIEF DESCRIPTION OF DRAWINGS

FIG. 1 is a partial cross-sectional schematic view of a tire that represents a pneumatic tire according to an embodiment of the present invention.

DESCRIPTION OF EMBODIMENTS

Embodiments of the present invention will be described in detail below.

Note that, in the present specification, (meth)acrylate represents acrylate or methacrylate, (meth)acryloyl represents acryloyl or methacryloyl, and (meth)acryl represents acryl or methacryl.

Furthermore, in the present specification, a numerical range indicated using "(from) . . . to . . . " include the former number as the lower limit value and the later number as the upper limit value.

The components in the present specification are not particularly limited as to their manufacturing methods unless otherwise noted. Examples thereof include known methods.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, the cases where at least one of processability, wet grip performance, and low rolling resistance is superior may be referred to as "exhibiting superior effect of the present invention".

Rubber Composition for Tire

The rubber composition for a tire according to an embodiment of the present invention (composition according to an embodiment of the present invention) is a rubber composition for a tire, the rubber composition containing:

a diene rubber;

silica; and a heterocyclic compound (where, the heterocyclic compound does not have a silicon atom) having a hydrocarbon group having from 3 to 30 carbons and at least one type of heterocycle selected from the group consisting of a piperazine ring, a morpholine ring, and a thiomorpholine ring, an average glass transition temperature of the diene rubber being −50° C. or higher, a content of the silica being from 80 to 200 parts by mass per 100 parts by mass of the diene rubber, and a content of the heterocyclic compound being from 0.5 to 20% by mass with respect to the content of the silica.

The composition according to an embodiment of the present invention is thought to achieve desired effects as a result of having such a configuration. Although the reason is not clear, it is assumed to be as follows.

The heterocyclic compound contained in the composition according to an embodiment of the present invention has a hydrocarbon group having from 3 to 30 carbons and at least one type of heterocycle selected from the group consisting of a piperazine ring, a morpholine ring, and a thiomorpholine ring.

It is considered that the hydrocarbon group easily interacts with the diene rubber because of having hydrophobicity, and the heterocycle easily interacts with silica because of having hydrophilicity.

Thus, the heterocyclic compound which has the hydrocarbon group as a hydrophobic part and the heterocycle as a hydrophilic part functions like a surfactant in the composition containing the diene rubber and the silica to increase dispersibility of the silica in a diene rubber. In light of this, the present inventors estimate that the Mooney viscosity in an unvulcanized rubber is lowered.

Further, the heterocyclic compound does not form a chemical bond although interacting with the diene rubber in the hydrocarbon group, and the heterocyclic compound interacts with the silica in the heterocycle but does not have a silicon atom. It is therefore considered that the heterocyclic compound does not form the chemical bond with the silica. For this reason, the present inventors presume that scorch (burning) can be suppressed because the heterocyclic compound does not have excessively high vulcanization accelerating effect.

As described above, it is considered that the presence of the heterocyclic compound lowers the Mooney viscosity, thus suppressing the scorch, and therefore the composition according to an embodiment of the present invention has superior processability.

Furthermore, as described above, it is presumed that excellent wet grip performance and low rolling resistance can be obtained when the composition according to an embodiment of the present invention is formed into a tire by enhancement of dispersibility of silica in the diene rubber by the heterocyclic compound.

Each of the components contained in the composition according to an embodiment of the present invention will be described in detail below.

Diene Rubber

The composition according to an embodiment of the present invention contains a diene rubber, and the average glass transition temperature of the diene rubber is −50° C. or higher.

Note that, in an embodiment of the present invention, the diene rubber does not include the low molecular weight conjugated diene polymer described below.

The diene rubber is not particularly limited. Examples of the diene rubber include a natural rubber (NR); aromatic vinyl-conjugated diene copolymer rubbers, such as a styrene butadiene rubber (SBR) and a styrene isoprene copolymer rubber; an isoprene rubber (IR), a butadiene rubber, an acrylonitrile-butadiene copolymer rubber (NBR), a butyl rubber (IIR), a halogenated butyl rubber (Br-IIR and Cl-IIR), and a chloroprene rubber (CR).

Among these, at least one type selected from the group consisting of aromatic vinyl-conjugated diene copolymer rubbers and butadiene rubbers is preferable, and at least one type selected from the group consisting of SBRs and butadiene rubbers is more preferable.

Modified Diene Rubber

The diene rubber can contain a modified diene rubber. The modified diene rubber can contain a modification group. The modification group is preferably a group that can interact with or bond to silica. Examples of the modification group include a hydroxy group, hydrocarbyloxysilane groups such as alkoxysilyl groups, a silanol group, a carboxy group, an aldehyde group, an amino group, an imino group, a thiol group, an epoxy group, and polysiloxane groups such as polyorganosiloxane groups, and combinations thereof.

Examples of the main chain of the modified diene rubber include substances that are same as those of the diene rubber described above.

The modification group and the main chain (the diene rubber described above) can be bonded directly or via an organic group. The organic group is not limited.

An example of preferred aspects is one in which the modification group is at a terminal of the modified diene rubber.

In the case where the diene rubber contains the modified diene rubber, the content of the modified diene rubber is preferably an amount that is greater than 50% by mass, and more preferably from 60 to 100% by mass, with respect to the total amount of the diene rubber from the perspective of exhibiting superior effect of the present invention (particularly, wet grip performance).

Furthermore, in the case where the diene rubber contains the modified diene rubber, the content of the modified diene rubber can be 90% by mass or less with respect to the total amount of the diene rubber.

In the case where the diene rubber contains the modified diene rubber and a diene rubber that is not modified (unmodified diene rubber), an example of the combination is a combination of a modified SBR and an unmodified BR.

The weight average molecular weight of the diene rubber can be a value that is greater than 30000. The weight average molecular weight of the diene rubber can be 2000000 or less.

The weight average molecular weight of the diene rubber is based on the measurement value by gel permeation chromatography (GPC) measured based on calibration with polystyrene standard using tetrahydrofuran as a solvent.

An example of a preferable aspect is one in which the diene rubber is solid at 23° C.

Average Glass Transition Temperature

In an embodiment of the present invention, the average glass transition temperature (average Tg) of the diene rubber is −50° C. or higher. The average glass transition temperature is preferably −45° C. or higher from the perspective of exhibiting superior effect of the present invention (particularly, wet grip performance).

The average glass transition temperature can be −25° C. or lower, or lower than −35° C.

The average Tg of diene rubbers is obtained by multiplying glass transition temperature (Tg) of each of the diene rubbers by percent by mass of the diene rubber with respect to the amount of the entire diene rubber, and then adding the obtained values.

Note that in the case where one type of diene rubber is used as the diene rubber, the average glass transition temperature of the diene rubber is the glass transition temperature of the one type of the diene rubber.

The glass transition temperature of each of diene rubbers is measured by using a differential scanning calorimeter (DSC) at a temperature increase rate of 20° C./min and calculated by the midpoint method.

Silica

The silica contained in the composition according to an embodiment of the present invention is not particularly limited. For example, a publicly known silica, which is blended in rubber compositions for applications to tires or the like, can be used.

Examples of the silica include wet silica, dry silica, fumed silica, and diatomaceous earth.

CTAB Adsorption Specific Surface Area of Silica

From the perspective of exhibiting superior effect of the present invention (particularly, wet grip performance), the CTAB adsorption specific surface area of the silica is preferably from 150 to 300 $m^2/g$, and more preferably from 180 to 300 $m^2/g$.

In an embodiment of the present invention, the CTAB adsorption specific surface area of the silica can be less than 210 m²/g.

Here, the CTAB adsorption specific surface area is an alternative characteristic of the surface area of the silica that can be utilized for adsorption to the silane coupling agent. The CTAB adsorption specific surface area is a value determined by measuring the amount of cetyltrimethylammonium bromide (CTAB) adsorption to the silica surface in accordance with JIS K6217-3:2001 "Part 3: Determination of specific surface area—CTAB adsorption methods".

Content of Silica

In an embodiment of the present invention, the content of the silica described above is from 80 to 200 parts by mass per 100 parts by mass of the diene rubber.

The content of the silica is preferably from 80 to 150 parts by mass, and more preferably from 80 to 130 parts by mass, per 100 parts by mass of the diene rubber, from the perspective of exhibiting superior effect of the present invention (particularly, wet grip performance).

In an embodiment of the present invention, the content of the silica can be less than 150 parts by mass per 100 parts by mass of the diene rubber.

Heterocyclic Compound

The heterocyclic compound contained in the composition according to an embodiment of the present invention has a hydrocarbon group having from 3 to 30 carbons and at least one type of heterocycle selected from the group consisting of a piperazine ring, a morpholine ring, and a thiomorpholine ring. In an embodiment of the present invention, the heterocyclic compound does not have a silicon atom.

The hydrocarbon group having from 3 to 30 carbons can function as a hydrophobic part.

The heterocyclic compound can be a compound which does not have an enamine structure (N—C=C).

Hydrocarbon Group Having from 3 to 30 Carbons

Examples of the hydrocarbon group having from 3 to 30 carbons include an aliphatic hydrocarbon group (including linear, branched, and cyclic types), an aromatic hydrocarbon group, and a combination thereof.

Among those, from the perspective of achieving more superior in processability, the aliphatic hydrocarbon group is preferable, and a saturated aliphatic hydrocarbon group is more preferable.

The number of carbons of the hydrocarbon group having from 3 to 30 carbons is preferably from 8 to 22, and more preferably from 8 to 18, from the perspective of achieving superior processability.

According to one of the preferred aspects, examples of the hydrocarbon group having from 3 to 30 carbons include one consisting of only a carbon atom and a hydrogen atom.

According to one of the preferred aspects, the hydrocarbon group having from 3 to 30 carbons is monovalent.

One molecule of the heterocyclic compound can have one or more of the hydrocarbon groups having from 3 to 30 carbons, and according to one of the preferred aspects, the heterocyclic compound has one or two of the hydrocarbon groups.

Heterocycle

In an embodiment of the present invention, the heterocyclic compound has at least one type of heterocycle selected from the group consisting of the piperazine ring, the morpholine ring, and the thiomorpholine ring.

One molecule of the heterocyclic compound can have one or more of the heterocycles, and according to one of the preferred aspects, the heterocyclic compound have one heterocycle.

From the perspective of achieving more superior in processability, the heterocycle is preferably the piperazine ring and the morpholine ring, and more preferably the piperazine ring.

Piperazine Ring

The piperazine ring means a skeleton of piperazine. The heterocyclic compound which has the piperazine ring as the heterocycle may be hereafter called a "piperazine compound." In an embodiment of the present invention, the piperazine ring does not include a triethylenediamine skeleton (diazabicyclooctane skeleton).

Morpholine Ring

The morpholine ring means a skeleton of morpholine. The heterocyclic compound which has the morpholine ring as the heterocycle may be hereafter called a "morpholine compound."

Thiomorpholine Ring

The thiomorpholine ring means a skeleton of thiomorpholine. The heterocyclic compound which has the thiomorpholine ring as the heterocycle may be hereafter called a "thiomorpholine compound."

Bonding of Heterocycle to Hydrocarbon Group Having from 3 to 30 Carbons

The hydrocarbon group having from 3 to 30 carbons can be bonded to a nitrogen atom or a carbon atom of the heterocycle of the heterocyclic compound directly or via an organic group.

According to one of the preferred aspects, the hydrocarbon group having from 3 to 30 carbons is bonded to the nitrogen atom of the heterocycle of the heterocyclic compound directly or via the organic group.

In the heterocyclic compound, in the case where the heterocycle is the morpholine ring, the hydrocarbon group having from 3 to 30 carbons can be bonded to a nitrogen atom or a carbon atom in the morpholine ring directly or via the organic group. The same goes for the case where the heterocycle is the thiomorpholine ring.

The organic group is not particularly limited. Examples of the organic group include a hydrocarbon group having an oxygen atom. Examples of the hydrocarbon group include the same one as the above.

The oxygen atom may form, for example, a carbonyl group or a hydroxy group.

In the case where the organic group is the hydrocarbon group having an oxygen atom at a terminal thereof, the oxygen atom may be bonded to the hydrocarbon group having from 3 to 30 carbons to form an ether bond. The hydrocarbon group having an oxygen atom may further have a hydroxy group.

The piperazine compound can further have the hydrocarbon group having from 3 to 30 carbons and a substituent other than the piperazine ring. Examples of the substituent include at least one type selected from the group consisting of a sulfone-based protecting group, a carbamate-based protecting group, and Formula (I-3): —$(R_2—O)_{n2}$—H.

In the case where the piperazine compound further has the substituent, the substituent can be bonded to a nitrogen atom of the piperazine ring of the piperazine compound.

In addition, in the piperazine compound, one hydrocarbon group having from 3 to 30 carbons is bonded to one of two nitrogen atoms of the piperazine ring, and the remaining nitrogen atom of the piperazine ring can be bonded to the hydrogen atom or the substituent.

Sulfone-Based Protecting Group

Examples of the sulfone-based protecting group include a methanesulfonyl group, a tosyl group, and a nosyl group.

Carbamate-Based Protecting Group

Examples of the carbamate-based protecting group include a tert-butoxycarbonyl group, an allyloxycarbonyl group, a benzyloxycarbonyl group, and a 9-fluorenylmethyloxycarbonyl group.

Formula (I-3)

In Formula (I-3): —$(R_2-O)_{n2}$—H, $R_2$ each independently represents a divalent hydrocarbon group.

In Formula (I-3), the number of carbons of the divalent hydrocarbon group is preferably 2 and 3.

The divalent hydrocarbon group is preferably an aliphatic hydrocarbon group. The aliphatic hydrocarbon group may be linear, branched, cyclic types or any combination thereof.

$n2$ represents from 1 to 10, and is preferably from 1 to 5.

From the perspective of achieving superior in processability and superior in dispersibility of silica, the heterocyclic compound is preferably a compound represented by the following Formula (I).

[Chemical Formula 2]

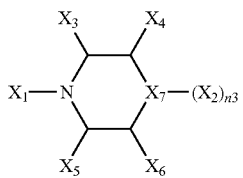

(I)

In Formula (I), $X_7$ represents at least one type selected from the group consisting of a nitrogen atom, an oxygen atom, and a sulfur atom, and $X_3$, $X_4$, $X_5$, and $X_6$ each independently represent a hydrogen atom or a hydrocarbon group.

When $X_7$ is a nitrogen atom, n3 is 1, and one or both of $X_1$ and $X_2$ each independently represent Formula (I-1): -$(A_1)_{n1-1}$-$R_{1-1}$, when only one of $X_1$ and $X_2$ represents Formula (I-1), the remaining groups represent at least one type selected from the group consisting of a hydrogen atom, a sulfone-based protecting group, a carbamate-based protecting group, and Formula (I-3): —$(R_2-O)_{n2}$—H, in Formula (I-3), $R_2$ each independently represents a divalent hydrocarbon group, and $n2$ represents from 1 to 10.

When $X_7$ is at least one type selected from the group consisting of an oxygen atom and a sulfur atom, n3 represents 0, and $X_1$ represents Formula (I-1): -$(A_1)_{n1-1}$-$R_{1-1}$.

In Formula (I-1), $A_1$ represents at least one type selected from the group consisting of a carbonyl group and Formula (I-2): —$R_{1-2}(OH)$—O—, n1-1 represents 0 or 1, and $R_{1-1}$ represents a hydrocarbon group having from 3 to 30 carbons, and in Formula (I-2), $R_{1-2}$ represents a trivalent hydrocarbon group.

In Formula (I), one or both of $X_1$ and $X_2$ each independently represent Formula (I-1): -$(A_1)_{n1-1}$-$R_{1-1}$.

Formula (I-1)

In Formula (I-1): -$(A_1)_{n1-1}$-$R_{1-1}$, $A_1$ represents at least one type selected from the group consisting of a carbonyl group and Formula (I-2): —$R_{1-2}(OH)$—O—.

n1-1 represents 0 or 1

$R_{1-1}$ represents the hydrocarbon group having from 3 to 30 carbons. The hydrocarbon group having from 3 to 30 carbons is the same as above.

Formula (I-2)

In Formula (I-2): —$R_{1-2}(OH)$—O—, $R_{1-2}$ represents a trivalent hydrocarbon group.

The number of carbon atoms of the trivalent hydrocarbon group is preferably from 3 to 30.

The trivalent hydrocarbon group is preferably an aliphatic hydrocarbon group. The aliphatic hydrocarbon group may be linear, branched, cyclic types or any combination thereof.

In Formula (I-2), the hydroxy group may be bonded to any carbon atom constituting $R_{1-2}$.

An example of a preferable aspect is one in which, in the case where n1-1 is 1 and $A_1$ is Formula (I-2): —$R_{1-2}(OH)$—O— in Formula (I-1): -$(A_1)_{n1-1}$-$R_{1-1}$, $R_{1-2}$ of Formula (I-2) bonds to a nitrogen atom of a heterocycle, the oxygen atom (—O—) of Formula (I-2) bonds to $R_{1-1}$, $R_{1-2}$ (trivalent hydrocarbon group) has 3 to 30 carbons, and three or more carbon atoms among the carbon atoms contained in $R_{1-2}$ (trivalent hydrocarbon group) are arranged side by side between the oxygen atom (—O—) and the nitrogen atom of the heterocycle.

$X_3$, $X_4$, $X_5$, and $X_6$

In Formula (I), $X_3$, $X_4$, $X_5$, and $X_6$ each independently represent a hydrogen atom or a hydrocarbon group.

The hydrocarbon group is not particularly limited. The hydrocarbon group may be a hydrocarbon group having from 3 to 30 carbons, or may be any other hydrocarbon group.

According to one of the preferred aspects, $X_3$, $X_4$, $X_5$, and $X_6$ each are a hydrogen atom.

In Formula (I), when $X_7$ is a nitrogen atom, n3 is 1, and only one of $X_1$ and $X_2$ represents Formula (I-1), the remaining groups can represent at least one type selected from the group consisting of a hydrogen atom, a sulfone-based protecting group, a carbamate-based protecting group, and Formula (I-3): —$(R_2-O)_{n2}$—H.

That is, when $X_1$ represents Formula (I-1), $X_2$ represents at least one type selected from the group consisting of a hydrogen atom, a sulfone-based protecting group, a carbamate-based protecting group, and Formula (I-3): —$(R_2-O)_{n2}$—H.

In addition, when $X_2$ represents Formula (I-1), $X_1$ represents at least one type selected from the group consisting of a hydrogen atom, a sulfone-based protecting group, a carbamate-based protecting group, and Formula (I-3): —$(R_2-O)_{n2}$—H. The sulfone-based protecting group, the carbamate-based protecting group and Formula (I-3) each are the same as those described above.

When the Heterocyclic Compound is a Compound Represented by Formula (I), $X_7$ is a Nitrogen Atom, and n3 is 1

The heterocyclic compound which is represented by Formula (I), where $X_7$ is a nitrogen atom and n3 is 1 is represented by the following Formula (II).

[Chemical Formula 3]

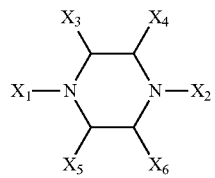

(II)

In Formula (II), one or both of $X_1$ and $X_2$ each independently represent Formula (I-1): -$(A_1)_{n1-1}$-$R_{1-1}$.

Formula (I-1)

In Formula (I-1): -(A$_1$)$_{n1-1}$-R$_{1-1}$, A$_1$ represents at least one type selected from the group consisting of a carbonyl group and Formula (I-2): —R$_{1-2}$(OH)—O—.

n1-1 represents 0 or 1.

R$_{1-1}$ represents a hydrocarbon group having from 3 to 30 carbons. The hydrocarbon group having from 3 to 30 carbons is the same as above.

Formula (I-2)

In Formula (I-2): —R$_{1-2}$(OH)—O—, R$_{1-2}$ represents a trivalent hydrocarbon group.

The number of carbon atoms of the trivalent hydrocarbon group is preferably from 3 to 30.

The trivalent hydrocarbon group is preferably an aliphatic hydrocarbon group. The aliphatic hydrocarbon group may be linear, branched, cyclic types or any combination thereof.

In Formula (I-2), the hydroxy group may be bonded to any carbon atom constituting R$_{1-2}$.

An example of a preferable aspect is one in which, in the case where n1-1 is 1 and A$_1$ is Formula (I-2): —R$_{1-2}$(OH)—O— in Formula (I-1): -(A$_1$)$_{n1-1}$-R$_{1-1}$, R$_{1-2}$ of Formula (I-2) bonds to a nitrogen atom of a piperazine ring, the oxygen atom (—O—) of Formula (I-2) bonds to R$_{1-1}$, R$_{1-2}$ (trivalent hydrocarbon group) has 3 to 30 carbons, and three or more carbon atoms among the carbon atoms contained in R$_{1-2}$ (trivalent hydrocarbon group) are arranged side by side between the oxygen atom (—O—) and the nitrogen atom of the piperazine ring.

X$_3$, X$_4$, X$_5$, and X$_6$

In Formula (II), X$_3$, X$_4$, X$_5$, and X$_6$ each independently represent a hydrogen atom or a hydrocarbon group.

The hydrocarbon group is not particularly limited. The hydrocarbon group may be a hydrocarbon group having from 3 to 30 carbons, or may be any other hydrocarbon group.

According to one of the preferred aspects, X$_3$, X$_4$, X$_5$, and X$_6$ each are a hydrogen atom.

In Formula (II), when only one of X$_1$ and X$_2$ represents Formula (I-1), the remaining groups can represent at least one type selected from the group consisting of a hydrogen atom, a sulfone-based protecting group, a carbamate-based protecting group, and Formula (I-3): —(R$_2$—O)$_{n2}$—H.

That is, when X$_1$ represents Formula (I-1), X$_2$ represents at least one type selected from the group consisting of a hydrogen atom, a sulfone-based protecting group, a carbamate-based protecting group, and Formula (I-3): —(R$_2$—O)$_{n2}$—H.

In addition, when X$_2$ represents Formula (I-1), X$_1$ represents at least one type selected from the group consisting of a hydrogen atom, a sulfone-based protecting group, a carbamate-based protecting group, and Formula (I-3): —(R$_2$—O)$_{n2}$—H. The sulfone-based protecting group, the carbamate-based protecting group and Formula (I-3) each are the same as those described above.

Examples of a specific aspect of the piperazine compound include the following aspect 1 or 2.

Aspect 1 of Piperazine Compound

The aspect 1 of the piperazine compound is represented by Formula (II), and

X$_1$ and X$_2$ each independently represent a compound represented by Formula (I-1) above.

In the aspect 1, X$_3$, X$_4$, X$_5$, and X$_6$ are each preferably a hydrogen atom.

Specific examples of the aspect 1 include piperazine compounds 3, 5 and 8 represented by the following Formula.

[Chemical Formula 4]

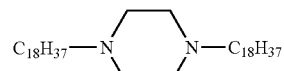

Piperazine compound 3

[Chemical Formula 5]

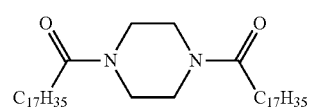

Piperazine compound 5

The piperazine compound 8 (R each independently represents —C$_{12}$H$_{25}$ or —C$_{13}$H$_{27}$)

[Chemical Formula 6]

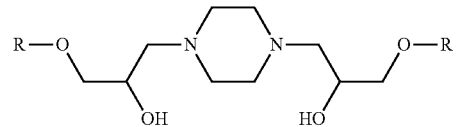

Note that the piperazine compound 8 may be a mixture of at least two types selected from the group consisting of a compound in which both R moieties are —C$_{12}$H$_{25}$, a compound in which both R moieties are —C$_{13}$H$_{27}$, and a compound in which one of the R moieties is —C$_{12}$H$_{25}$ and the other R moiety is —C$_{13}$H$_{27}$.

Aspect 2 of Piperazine Compound

The aspect 2 of the piperazine compound is represented by Formula (II), and is a compound, in which only one of X$_1$ or X$_2$ represents Formula (I-1), and the other groups each represent at least one type selected from the group consisting of a hydrogen atom, a sulfone-based protecting group, a carbamate-based protecting group, and Formula (I-3) above: —(R$_2$—O)$_{n2}$—H.

In the aspect 2, X$_3$, X$_4$, X$_5$, and X$_6$ are preferably a hydrogen atom.

Specific examples of the aspect 2 include piperazine compounds 1, 2, 4, 6, and 7 represented by the following Formula.

[Chemical Formula 7]

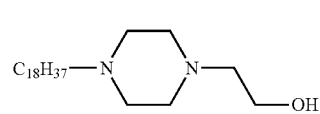

Piperazine compound 1

The piperazine compound 2 (in the following structural Formula, n is 1 to 10, and preferably 1 to 5)

[Chemical Formula 8]

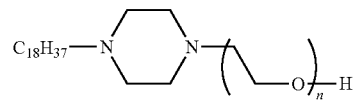

[Chemical Formula 9]

Piperazine compound 4

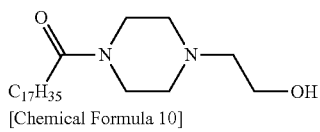

[Chemical Formula 10]

Piperazine compound 6

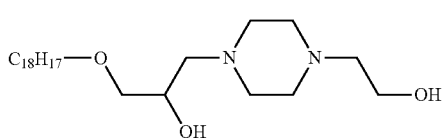

The piperazine compound 7 (R each independently represents —$C_{12}H_{25}$ or —$C_{13}H_{27}$. The piperazine compound 7 may also be a mixture of a piperazine compound in which R is —$C_{12}H_{25}$ and a piperazine compound in which R is —$C_{13}H_{27}$)

[Chemical Formula 11]

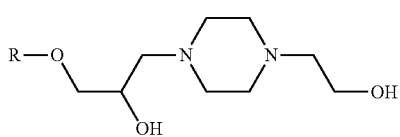

When the Heterocyclic Compound is a Compound Represented by Formula (I), $X_7$ is an Oxygen Atom or a Sulfur Atom, and n3 is 0

The heterocyclic compound which is represented by Formula (I), where $X_7$ is an oxygen atom or a sulfur atom, and n3 is 0 is represented by the following Formula (III).

[Chemical Formula 12]

$$\begin{array}{c} X_3 \quad X_4 \\ X_1-N \quad X_8 \\ X_5 \quad X_6 \end{array} \quad (III)$$

In Formula (III), $X_1$ is the same as Formula (I-1): -$(A_1)_{n1-1}$-$R_{1-1}$ of Formula (I) above, $X_3$, $X_4$, $X_5$, and $X_6$ are the same as $X_3$, $X_4$, $X_5$, and $X_6$ of Formula (I) above, respectively, and $X_8$ is at least one type selected from the group consisting of an oxygen atom and a sulfur atom.

Examples of the compound represented by Formula (III) include morpholine compounds 1 to 4 represented by the following Formula.

[Chemical Formula 13]

Morpholine compound 1

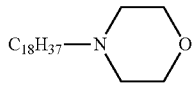

[Chemical Formula 14]

Morpholine compound 2

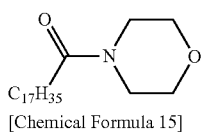

[Chemical Formula 15]

Morpholine compound 3

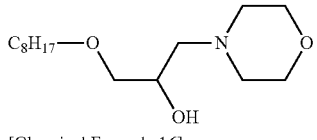

[Chemical Formula 16]

Morpholine compound 4

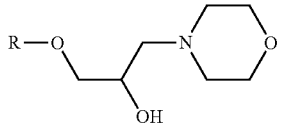

In the morpholine compound 4, R represents —$C_{12}H_{25}$ or —$C_{13}H_{27}$. The morpholine compound 4 may be a mixture of a morpholine compound in which R is —$C_{12}H_{25}$ and a morpholine compound in which R is —$C_{13}H_{27}$.

A method for producing a heterocyclic compound is not particularly limited. Examples thereof include known methods.

Specifically, for example, a hydrocarbon compound having from 3 to 30 carbons which has at least one type selected from the group consisting of piperazine, morpholine, and thiomorpholine which may have a substituent and at least one type selected from the group consisting of a halogen atom (chlorine, bromine, iodine, or the like), an acid halogen group (acid chloride group, acid bromide group, and acid iodide group, or the like), and a glycidyloxy group is reacted in a solvent as needed, thereby obtaining the heterocyclic compound. The substituent is the same as above. The hydrocarbon group having from 3 to 30 carbons of the hydrocarbon compound is the same as above.

In addition, examples of the method for producing a piperazine compound having Formula (I-3): —$(R_2$—O$)_{n2}$—H as in the piperazine compound 2 include a method for reacting a piperazine compound having a hydroxy group as in the piperazine compound 1 with an alkylene oxide in the presence of a metal alkoxide.

Content of Heterocyclic Compound

In an embodiment of the present invention, the content of the heterocyclic compound is from 0.5 to 20% by mass with respect to the content of the silica.

The content of the heterocyclic compound is preferably from 1 to 15% by mass, and more preferably from 1 to 10% by mass with respect to the content of the silica, from the perspectives of exhibiting superior effect of the present invention and achieving excellent dispersibility of silica.

Silane Coupling Agent

The composition according to an embodiment of the present invention can further contain a silane coupling agent.

The silane coupling agent is not particularly limited. The silane coupling agent can have a hydrolyzable group.

The hydrolyzable group is not particularly limited; however, examples thereof include alkoxy groups, phenoxy groups, carboxyl groups, and alkenyloxy groups. Among these, alkoxy groups are preferable. In the case where the hydrolyzable group is an alkoxy group, the number of carbon atoms of the alkoxy group is preferably from 1 to 16, and more preferably from 1 to 4. Examples of the alkoxy group having from 1 to 4 carbons include a methoxy group, an ethoxy group, and a propoxy group.

The silane coupling agent can have a sulfur atom-containing group, besides the hydrolyzable group. For example, the sulfur atom can constitute a sulfide group (including a monosulfide group and a polysulfide group), a mercapto group, and a carbonyl thio group.

Examples of the silane coupling agent include sulfur-containing silane coupling agents and polysiloxane backbone-containing silane coupling agents.

The polysiloxane backbone refers to a polymer having a plurality of repeating units of —(Si—O)—. The polysiloxane backbone can be a linear, branched, or three-dimensional structure, or a combination thereof.

The silane coupling agent may have a polysiloxane backbone or have no polysiloxane backbone.

Examples of the silane coupling agent include polysulfide silanes, such as bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, and bis(3-trimethoxysilylpropyl) disulfide;

silane coupling agents represented by Formula (a) below;
silane coupling agents represented by Formula (b) below; and
silane coupling agents represented by Formula (2) below, such as 3-[ethoxybis(3,6,9,12,15-pentaoxaoctacosan-1-yloxy)silyl]-1-propanethiol (Si 363, available from Evonik Degussa), and mercapto group-containing silane coupling agents, such as γ-mercaptopropylmethyldimethoxysilane and γ-mercaptopropyltrimethoxysilane.

Among these, from the perspective of exhibiting superior effect of the present invention, at least one type of sulfur-containing silane coupling agent selected from the group consisting of silane coupling agents represented by Formula (a) below, silane coupling agents represented by Formula (b) below, and mercapto group-containing silane coupling agents is preferable.

Silane Coupling Agent Represented by Formula (a)
Formula (a) is $(C_LH_{2L+1}O)_3$—Si—$(CH_2)_m$—S—C(=O)—$(C_nH_{2n+1})$.

In Formula (a), L is from 1 to 3, m is from 1 to 3, and n is from 1 to 15.

$C_LH_{2L+1}$ may be linear or branched.

$(C_nH_{2n+1})$ may be linear, branched, or cyclic, or a combination thereof.

Examples of the silane coupling agent represented by Formula (a) include 3-octanoylthio-1-propyltriethoxysilane.

Silane Coupling Agent Represented by Formula (b)
Formula (b) is $(A)_a(B)_b(C)_c(D)_d(R^1)_eSiO_{(4-2a-b-c-d-e)/2}$.

Note that Formula (b) is an average compositional formula.

In Formula (b), A represents a divalent organic group having a sulfide group. B represents a monovalent hydrocarbon group having from 5 to 10 carbons. C represents a hydrolyzable group. D represents an organic group having a mercapto group. $R^1$ represents a monovalent hydrocarbon group having from 1 to 4 carbons. a to e satisfy the relationship formulas $0 \leq a < 1$, $0 < b < 1$, $0 < c < 3$, $0 \leq d < 1$, $0 \leq e < 2$, and $0 < 2a+b+c+d+e < 4$.

However, the case where both a and d are 0 at the same time is excluded.

An example of a preferable aspect is one in which the silane coupling agent represented by Formula (b) above has a polysiloxane backbone.

(A)
In Formula (b) above, A represents a divalent organic group containing a sulfide group (hereinafter, also referred to as "sulfide group-containing organic group"). The organic group may be, for example, a hydrocarbon group optionally having a hetero atom such as an oxygen atom, a nitrogen atom, or a sulfur atom.

Among these, a group represented by the following Formula (4) is preferable.

$$*-(CH_2)_n-S_x-(CH_2)_n-* \qquad (4)$$

In Formula (4) above, n is an integer of 1 to 10, among which an integer of 2 to 4 is preferable.

In Formula (4) above, x is an integer of 1 to 6, among which an integer of 2 to 4 is preferable.

In Formula (4) above, * represents a bond position.

Specific examples of the group represented by Formula (4) above include *—$CH_2$—$S_2$—$CH_2$—*, *—$CH_2H_4$—$S_2$—$C_2H_4$—*, *—$C_3H_6$—$S_2$—$C_3H_6$—*, *—$C_4H_8$—$S_2$—$C_4H_8$—*, *—$CH_2$—$S_4$—$CH_2$—*, *—$C_2H_4$—$S_4$—$C_2H_4$—*, *—$C_3H_6$—$S_4$—$C_3H_6$—*, and *—$C_4H_8$—$S_4$—$C_4H_8$—*

(B)
In Formula (b) above, B represents a monovalent hydrocarbon group having from 5 to 10 carbons. Specific examples thereof include a hexyl group, an octyl group, and a decyl group. B can protect a mercapto group.

From the perspectives of exhibiting superior effect of the present invention (particularly, processability) and achieving excellent dispersibility of silica, B is preferably a monovalent hydrocarbon group having from 8 to 10 carbons.

(C)
In Formula (b) above, C represents a hydrolyzable group, and specific examples thereof include alkoxy groups, phenoxy groups, carboxyl groups, and alkenyloxy groups. Among these, a group represented by Formula (5) below is preferable.

$$*-OR^2 \qquad (5)$$

In Formula (5) above, $R^2$ represents an alkyl group having from 1 to 20 carbons, an aryl group having from 6 to 10 carbons, an aralkyl group (aryl alkyl group) having from 7 to 10 carbons, or an alkenyl group having from 2 to 10 carbons. Among these, $R^2$ is preferably an alkyl group having from 1 to 5 carbons.

Specific examples of the alkyl group having from 1 to 20 carbons include a methyl group, an ethyl group, a propyl group, a butyl group, a hexyl group, an octyl group, a decyl group, and an octadecyl group.

Specific examples of the aryl group having from 6 to 10 carbons include a phenyl group, and a tolyl group.

Specific examples of the aralkyl group having from 7 to 10 carbons include a benzyl group and a phenylethyl group.

Specific examples of the alkenyl group having from 2 to 10 carbons include a vinyl group, a propenyl group, and a pentenyl group.

In Formula (5) above, * represents a bond position.

(D)
In Formula (b) above, D is an organic group having a mercapto group. Among these, a group represented by Formula (6) below is preferable.

$$*-(CH_2)_m-SH \qquad (6)$$

In Formula (6) above, m is an integer of 1 to 10. Among these, m is preferably an integer of 1 to 5.

In Formula (6) above, * represents a bond position.

Specific examples of the group represented by Formula (6) above include *—$CH_2SH$, *—$C_2H_4SH$, *—$C_3H_6SH$, *—$C_4H_8SH$, *—$C_5H_{10}SH$, *—$C_6H_{12}SH$, *—$C_7H_{14}SH$, *—$C_8H_{16}SH$, *—$C_9H_{18}SH$, and *—$C_{10}H_{20}SH$.

($R^1$)

In Formula (b) above, $R^1$ represents a monovalent hydrocarbon group having from 1 to 4 carbons. Examples thereof include a methyl group, an ethyl group, a propyl group, and a butyl group.

(a to e)

In Formula (b) above, a to e satisfy the relationship formulas $0 \le a<1$, $0<b<1$, $0<c<3$, $0 \le d<1$, $0 \le e<2$, and $0<2a+b+c+d+e<4$.

In the silane coupling agent represented by Formula (b), a is preferably greater than 0 ($0<a$) and more preferably satisfies $0<a \le 0.50$, from the perspectives of exhibiting superior effect of the present invention (particularly, processability) and achieving excellent dispersibility of silica.

In Formula (b) above, from the perspectives of exhibiting superior effect of the present invention (particularly, processability) and achieving excellent dispersibility of silica, b preferably satisfies $0.10 \le b \le 0.89$.

In Formula (b) above, from the perspectives of exhibiting superior effect of the present invention (particularly, processability) and achieving excellent dispersibility of silica, c preferably satisfies $1.2 \le c \le 2.0$.

In Formula (b) above, from the perspectives of exhibiting superior effect of the present invention (particularly, processability) and achieving excellent dispersibility of silica, d preferably satisfies $0.1 \le d \le 0.8$.

In Formula (b) above, from the perspectives of exhibiting superior effect of the present invention (particularly, processability) and achieving excellent dispersibility of silica, $0<2a+b+c+d+e \le 3$ is preferably satisfied.

In the silane coupling agent represented by Formula (b), from the perspectives of exhibiting superior effect of the present invention (particularly, processability) and achieving excellent dispersibility of silica, it is preferable for A to be a group represented by Formula (4) above, C to be a group represented by Formula (5) above, and D to be a group represented by Formula (6) above, and it is more preferable for A to be a group represented by Formula (4) above, C to be a group represented by Formula (5) above, D to be a group represented by Formula (6) above, and B is a monovalent hydrocarbon group having from 8 to 10 carbons, in Formula (b) above.

The weight average molecular weight of the silane coupling agent represented by Formula (b) is preferably from 500 to 2300, and more preferably from 600 to 1500, from the perspectives of exhibiting superior effect of the present invention (particularly, processability) and achieving excellent dispersibility of silica. The molecular weight of the silane coupling agent represented by Formula (b) is a weight average molecular weight by gel permeation chromatography (GPC) measured based on calibration with polystyrene using toluene as a solvent.

The mercapto equivalent of the silane coupling agent represented by Formula (b) determined by the acetic acid/potassium iodide/potassium iodate addition-sodium thiosulfate solution titration method is preferably from 550 to 1900 g/mol, and more preferably from 600 to 1800 g/mol, from the perspective of exhibiting excellent vulcanization reactivity.

Silane Coupling Agent Represented by Formula (2)

Formula (2) is as described below.

[Chemical Formula 17]

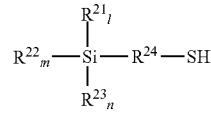

(2)

In Formula (2), $R^{21}$ represents an alkoxy group having from 1 to 8 carbons. $R^{22}$ represents a polyether group having a hydrocarbon group at a terminal. $R^{23}$ represents a hydrogen atom or an alkyl group having from 1 to 8 carbons. $R^{24}$ represents an alkylene group having from 1 to 30 carbons. l represents an integer of 1 to 2, m represents an integer of 1 to 2, n represents an integer of 0 to 1, and l, m, and n satisfy the relationship formula $l+m+n=3$. In the case where l is 2, a plurality of $R^{21}$ may be the same or different. In the case where m is 2, a plurality of $R^{22}$ may be the same or different.

($R^{21}$)

In Formula (2) above, $R^{21}$ represents an alkoxy group having from 1 to 8 carbons. Among these, from the perspective of obtaining a tire having excellent low rolling resistance, an alkoxy group having from 1 to 3 carbons is preferable. Examples of the alkoxy group having from 1 to 3 carbons include a methoxy group and an ethoxy group.

($R^{22}$)

In Formula (2) above, $R^{22}$ represents a polyether group having a hydrocarbon group at a terminal. The polyether group is a group having two or more ether bonds. Note that, in the case where m is 2, a plurality of $R^{22}$ may be the same or different.

A preferred aspect of the polyether group having a hydrocarbon group at a terminal is a group represented by Formula (5) below.

[Chemical Formula 18]

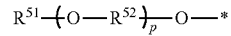

(5)

($R^{51}$)

In Formula (5) above, $R^{51}$ represents a linear alkyl group, a linear alkenyl group, or a linear alkynyl group, and among these, a linear alkyl group is preferable. As the linear alkyl group, a linear alkyl group having from 1 to 20 carbons is preferable, and a linear alkyl group having from 8 to 15 carbons is more preferable. Specific example of the linear alkyl group having from 8 to 15 carbons include an octyl group, a nonyl group, a decyl group, an undecyl group, a dodecyl group, and a tridecyl group. Among these, a tridecyl group is preferable.

($R^{52}$)

In Formula (5) above, $R^{52}$ represents a linear alkylene group, a linear alkenylene group, or a linear alkynylene group. Among these, a linear alkylene group is preferable. As the linear alkylene group, a linear alkylene group having from 1 to 2 carbons is preferable, and an ethylene group is more preferable.

(p)

In Formula (5) above, p is an integer of 1 to 10, and preferably an integer of 3 to 7.

In Formula (5) above, * represents a bond position.

($R^{23}$)

In Formula (2) above, $R^{23}$ represents a hydrogen atom or an alkyl group having from 1 to 8 carbons.

($R^{24}$)

In Formula (2) above, $R^{24}$ represents an alkylene group having from 1 to 30 carbons. Among these, an alkylene group having from 1 to 12 carbons is preferable, and an alkylene group having from 1 to 5 carbons is more preferable. Specific examples of the alkylene group having from 1 to 5 carbons include a methylene group, an ethylene group, a trimethylene group, and a propylene group.

(l, m, n)

In Formula (2) above, l represents an integer of 1 to 2, and is preferably 1. In Formula (2) above, m represents an integer of 1 to 2, and is preferably 2. n represents an integer of 0 to 1, and is preferably 0. l, m, and n satisfy the relationship formula l+m+n=3.

Specific examples of the silane coupling agent represented by Formula (2) include 3-[ethoxybis(3,6,9,12,15-pentaoxaoctacosan-1-yloxy)silyl]-1-propanethiol (Si 363, available from Evonik Degussa).

A method for producing a silane coupling agent is not particularly limited. Examples thereof include known methods.

The content of the silane coupling agent is preferably from 2 to 20 parts by mass, and more preferably from 5 to 15 parts by mass, per 100 parts by mass of the silica, from the perspective of exhibiting superior effect of the present invention (particularly, processability) and achieving excellent dispersibility of silica.

Low Molecular Weight Conjugated Diene Polymer

The composition according to an embodiment of the present invention can further contain a low molecular weight conjugated diene polymer that has a weight average molecular weight of 1000 to 30000 and that can be modified. The low molecular weight conjugated diene polymer is a polymer having a repeating unit of conjugated diene (conjugated diene unit).

In the case where the composition according to an embodiment of the present invention further contains the low molecular weight conjugated diene polymer, superior processability or low rolling resistance is achieved.

Note that the low molecular weight conjugated diene polymer does not correspond to the diene rubbers described above.

Weight Average Molecular Weight of Low Molecular Weight Conjugated Diene Polymer Note that the weight average molecular weight (Mw) of the low molecular weight conjugated diene polymer is measured by gel permeation chromatography (GPC) based on calibration with polystyrene standard using tetrahydrofuran as a solvent.

The weight average molecular weight of the low molecular weight conjugated diene polymer is preferably from 4000 to 10000 from the perspective of exhibiting superior effect of the present invention (particularly, low rolling resistance).

An example of a preferable aspect is one in which the low molecular weight conjugated diene polymer is liquid at 23° C.

Specific examples of the low molecular weight conjugated diene polymer include butadiene rubber, isoprene rubber, acrylonitrile-butadiene rubber, and styrene butadiene rubber.

The low molecular weight conjugated diene polymer may be modified or unmodified.

In the case where the low molecular weight conjugated diene polymer is modified, the modification group contained in the low molecular weight conjugated diene polymer that has been modified (modified low molecular weight conjugated diene polymer) is preferably a group that can interact with or bond to silica. Examples of the modification group include a hydroxy group, hydrocarbyloxysilane groups such as alkoxysilyl groups, a silanol group, a carboxy group, an aldehyde group, an amino group, an imino group, a thiol group, an epoxy group, and polysiloxane groups such as polyorganosiloxane groups, and combinations thereof.

Examples of the main chain of the modified low molecular weight conjugated diene polymer include substances that are same as those of the low molecular weight conjugated diene polymer.

The modification group and the main chain can be bonded directly or via an organic group. The organic group is not particularly limited.

An example of preferred aspects is one in which the modification group is at a terminal of the modified low molecular weight conjugated diene polymer.

From the perspective of excellent fuel efficiency, the vinyl bond content of the low molecular weight conjugated diene polymer is preferably from 20 to 95%, more preferably from 20 to 90%, and even more preferably from 20 to 70%.

In the case where the low molecular weight conjugated diene polymer further contains a repeating unit of aromatic vinyl (aromatic vinyl unit) besides the conjugated diene unit, the aromatic vinyl unit content is preferably from 20 to 40% by mass of the amount of the low molecular weight conjugated diene polymer.

In embodiments of the present invention, the aromatic vinyl unit content and the vinyl bond content can be measured by $^1$H-NMR.

In an embodiment of the present invention, in the case where the low molecular weight conjugated diene polymer is further contained, the content of the low molecular weight conjugated diene polymer is preferably from 5 to 30 parts by mass, and more preferably from 5 to 20 parts by mass, per 100 parts by mass of the diene rubber, from the perspective of exhibiting superior effect of the present invention (particularly, processability).

The mass ratio of the heterocyclic compound to the low molecular weight conjugated diene polymer (heterocyclic compound/low molecular weight conjugated diene polymer) is preferably from 0.1 to 1.0, and more preferably from 0.1 to 0.4, from the perspective of exhibiting superior effect of the present invention.

(Additives)

The composition according to an embodiment of the present invention may further contain additives as necessary within a scope that does not impair the effect or purpose thereof. Examples of the additive include rubbers other than diene rubber, fillers other than silica (for example, carbon black), a vulcanization accelerator, a resin, zinc oxide, a stearic acid, an anti-aging agent, a processing aid, oil, a vulcanizing agent such as sulfur, and those generally used in a rubber composition for a tire such as peroxide. The content of the additive can be appropriately selected.

Carbon Black

The composition according to an embodiment of the present invention can further contain carbon black.

The carbon black is not particularly limited. For example, as the carbon black, carbon blacks having various grades can be used. Examples of the grades include Super Abrasion Furnace (SAF, hereinafter the same)-High Structure (-HS, hereinafter the same), SAF, Intermediate Super Abrasion Furnace (ISAF, hereinafter the same)-HS, ISAF, ISAF-Low Structure (LS, hereinafter the same), Intermediate ISAF (IISAF)-HS, High Abrasion Furnace (HAF, hereinafter the same)-HS, HAF, HAF-LS, and Fast Extruding Furnace (FEF).

The nitrogen adsorption specific surface area ($N_2SA$) of the carbon black is preferably from 50 to 200 $m^2/g$ from the perspective of achieving superior in processability. The nitrogen adsorption specific surface area of the carbon black is measured in accordance with JIS K 6217-2.

The content of the carbon black is preferably from 1 to 50 parts by mass and more preferably from 1 to 20 parts by mass per 100 parts by mass of the diene rubber.

Method for Producing Rubber Composition

The method for producing the composition according to an embodiment of the present invention is not particularly limited. Specific examples thereof include a method for mixing each of the above-described components at a temperature from 100 to 200° C. using known methods and apparatuses (for example, a Banbury mixer, a kneader, or a roll).

In addition, the composition according to an embodiment of the present invention can be, for example, vulcanized or crosslinked under publicly known vulcanizing or crosslinking conditions.

For example, a tire can be produced using the composition according to an embodiment of the present invention.

The constituent members of the pneumatic tire that can be produced by the composition according to an embodiment of the present invention are not particularly limited. Examples of the member include a tire tread such as a cap tread, a sidewall, and a bead filler.

The cap tread is a constituent member that is typically on the outermost surface of a tire tread. In the present invention, an example of a preferable aspect is one in which the composition according to an embodiment of the present invention is included at least in the cap tread.

Pneumatic Tire

The pneumatic tire according to an embodiment of the present invention is a pneumatic tire including the rubber composition for a tire according to an embodiment of the present invention in the cap tread.

The rubber composition used in the cap tread is not particularly limited as long as the rubber composition is the rubber composition for a tire according to an embodiment of the present invention (composition according to an embodiment of the present invention).

The cap tread is a portion, which is in direct contact with the road surface, of a pneumatic tire.

The pneumatic tire according to an embodiment of the present invention is not particularly limited as long as the composition according to an embodiment of the present invention is included in the cap tread (cap tread is formed from the composition according to an embodiment of the present invention).

FIG. 1 is a schematic partial cross-sectional view of a tire that represents a pneumatic tire according to an embodiment of the present invention. The present invention is not limited to the accompanying drawings.

In FIG. 1, the pneumatic tire includes a bead portion 1, a sidewall portion 2, and a tire tread portion 3. A carcass layer 4, in which a fiber cord is embedded, is mounted between a pair of left and right bead portions 1, and an end portion of the carcass layer 4 is folded outward from an inside of the tire around the bead core 5 and the bead filler 6 and rolled up. In the tire tread portion 3, a belt layer 7 is provided along the entire periphery of the tire on the outer side of the carcass layer 4. In the bead portion 1, a rim cushion 8 is disposed in a portion in contact with a rim.

The tire tread portion 3 includes a cap tread on the belt layer 7. An undertread may be disposed between the belt layer 7 and the cap tread.

The composition according to an embodiment of the present invention described above is included in the cap tread of the tire tread portion 3.

The pneumatic tire according to an embodiment of the present invention can be produced, for example, in accordance with a known method.

As a gas with which the pneumatic tire is filled, an inert gas such as nitrogen, argon, or helium, can be used in addition to a normal air or air whose oxygen partial pressure is adjusted.

EXAMPLE

The present invention is described below in detail using examples but the present invention is not limited to such examples.

Production of Piperazine Compound

Synthesis of Piperazine Compound 1

33.3 g of 1-bromooctadecane (available from Tokyo Chemical Industry Co., Ltd.) and 13.0 g of 1-(2-hydroxyethyl) piperazine (hydroxyethyl piperazine, available from Nippon Nyukazai Co., Ltd.) were reacted in tetrahydrofuran and dichloromethane at room temperature for 1 hour. A reaction solution was washed with an aqueous potassium carbonate solution, extracted with dichloromethane, and dehydrated with anhydrous magnesium sulfate. An anhydrous magnesium sulfate was filtered off and concentrated to obtain a piperazine compound 1 represented by the following Formula.

[Chemical Formula 19]

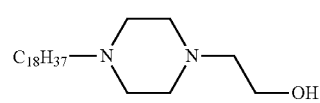

Piperazine compound 1

Synthesis of Piperazine Compound 2

39.6 g of the piperazine compound 1 obtained as described above, 13.2 g of ethylene oxide, and 0.004 g of sodium methoxide were reacted. The reaction solution was neutralized with phosphoric acid and filtered to obtain a piperazine compound 2 represented by the following Formula. n in the following Formula is 3.

[Chemical Formula 20]

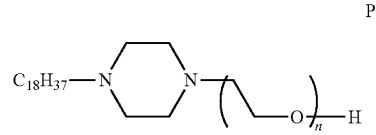

Piperazine compound 2

Synthesis of Piperazine Compound 3

66.6 g of 1-bromooctadecane (available from Tokyo Chemical Industry Co., Ltd.) and 19.04 g of piperazine hexahydrate (piperazine hexahydrate, available from Nippon Nyukazai Co., Ltd.) were reacted in tetrahydrofuran and dichloromethane at room temperature for 1 hour. A reaction solution was washed with an aqueous potassium carbonate solution, extracted with dichloromethane, and dehydrated with anhydrous magnesium sulfate. An anhydrous magnesium sulfate was filtered off and concentrated to obtain a piperazine compound 3 represented by the following Formula.

[Chemical Formula 21]

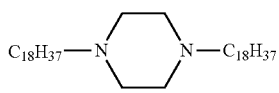

Piperazine compound 3

Synthesis of Piperazine Compound 4

30.3 g of stearoyl chloride (available from Tokyo Chemical Industry Co., Ltd.), 13.0 g of 1-(2-hydroxyethyl)piperazine (hydroxyethyl piperazine, available from Nippon Nyukazai Co., Ltd.), and 15.2 g of triethylamine were reacted in toluene at 0° C. for 1 hour. A reaction solution was washed with an aqueous sodium carbonate solution, extracted with toluene, and dehydrated with anhydrous magnesium sulfate. An anhydrous magnesium sulfate was filtered off and concentrated to obtain a piperazine compound 4 represented by the following Formula.

[Chemical Formula 22]

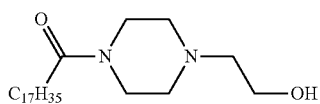

Piperazine compound 4

Synthesis of Piperazine Compound 5

60.6 g of stearoyl chloride (available from Tokyo Chemical Industry Co., Ltd.), 19.04 g of piperazine hexahydrate (piperazine hexahydrate, available from Nippon Nyukazai Co., Ltd.), and 30.4 g of triethylamine were reacted in toluene at 0° C. for 1 hour. A reaction solution was washed with an aqueous sodium carbonate solution, extracted with toluene, and dehydrated with anhydrous magnesium sulfate. An anhydrous magnesium sulfate was filtered off and concentrated to obtain a piperazine compound 5 represented by the following Formula.

[Chemical Formula 23]

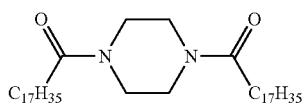

Piperazine compound 5

Synthesis of Piperazine Compound 6

18.5 g of 2-ethylhexyl glycidyl ether (Epogosey (trade name) 2EH, available from Yokkaichi Chemical Company, Limited.) and 13.0 g of 1-(2-hydroxyethyl) piperazine (hydroxyethyl piperazine, available from Nippon Nyukazai Co., Ltd.) were reacted at 60° C. for 4 hours to obtain a piperazine compound 6 represented by the following Formula.

The results of $^1$H-NMR of the piperazine compound 6 are as follows.

$^1$H-NMR (400 MHz, CDCl$_3$): δ 3.85 (m, 1H), 3.60 (t, 2H), 3.30-3.47 (m, 4H), 2.65 (m, 2H), 2.54 (t, 4H), 2. 46 (t, 2H), 2. 38 (dd, 2H), 1.52 (q, 1H), 1.26-1.41 (m, 8H), 0.89 (t, 5H), and 0.85 (s, 1H)

[Chemical Formula 24]

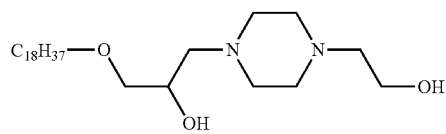

Piperazine compound 6

Synthesis of Piperazine Compound 7

28.4 g of C12 and C13 mixed alcohol glycidyl ether (Epogosey (trade name) EN, available from Yokkaichi Chemical Company, Limited. Mixture of C12 alcohol glycidyl ether and C13 alcohol glycidyl ether) and 13.0 g of 1-(2-hydroxyethyl) piperazine (hydroxyethyl piperazine, available from Nippon Nyukazai Co., Ltd.) were reacted at 60° C. for 4 hours to obtain a piperazine compound 7 represented by the following Formula (R represents —C$_{12}$H$_{25}$ or —C$_{13}$H$_{27}$. The piperazine compound 7 is a mixture of a piperazine compound in which R is —C$_{12}$H$_{25}$ and a piperazine compound in which R is —C$_{13}$H$_{27}$).

[Chemical Formula 25]

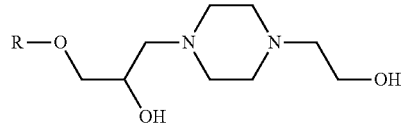

Piperazine compound 7

Synthesis of Piperazine Compound 8

56.8 g of C12 and C13 mixed alcohol glycidyl ether (Epogosey (trade name) EN, available from Yokkaichi Chemical Company, Limited.) and 19.04 g of piperazine hexahydrate (piperazine hexahydrate, available from Nippon Nyukazai Co., Ltd.) were reacted in ethanol at 60° C. for 6 hours. The reaction solution was washed with saturated saline, extracted with ethyl acetate, and dehydrated with anhydrous magnesium sulfate. Anhydrous magnesium sulfate was filtered off and concentrated to obtain a piperazine compound 8 (R each independently represents —C$_{12}$H$_{25}$ or —C$_{13}$H$_{27}$) represented by the following Formula.

[Chemical Formula 26]

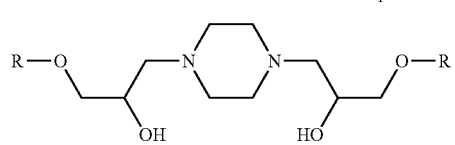

Piperazine compound 8

Synthesis of Morpholine Compound 3

18.5 g of 2-ethylhexyl glycidyl ether (Epogosey (trade name) 2EH, available from Yokkaichi Chemical Company, Limited.) and 8.7 g of morpholine (available from Tokyo Chemical Industry Co., Ltd.) were reacted at 60° C. for 4 hours to obtain a morpholine compound 3 (following structure).

[Chemical Formula 27]

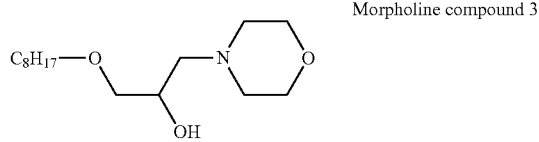

Morpholine compound 3

Production of Composition for Tire

Each of the components shown in Table 1 below was blended at the composition (part by mass) shown in the same table.

Specifically, a master batch was obtained by heating the components shown in Table 1 below, excluding the sulfur and the vulcanization accelerator, to a temperature near 150° C. in a 1.7-L closed-type Banbury mixer, mixing the mixture for 5 minutes, then discharging the mixture, and cooling the mixture to room temperature. The sulfur and vulcanization accelerator were then mixed into the resulting master batch by using the Banbury mixer described above so as to obtain a rubber composition for a tire.

Note that, in Table 1, for the amount of SBR, a value in an upper row is an amount of the rubber (oil-extended product) (unit: part by mass), and a value in a lower row is a net amount of the rubber (unit: part by mass). The same applies to Tables 2 and 3.

For Table 2, the rubber compositions for tires were produced in the same manner as for Table 1.

For Table 3, the rubber compositions for tires were produced in the same manner as for Table 1.

<Evaluation>

The following evaluations were performed by using each of the rubber compositions for tires produced as described above. The results are shown in Tables 1 to 3. In each table, an evaluation result of each example for each of the evaluation items was expressed as an index value with respect to the evaluation result (100) of the Standard Example.

Mooney Viscosity

By using each of the rubber compositions for tires produced as described above, the Mooney viscosity ($ML_{1+4}$) at 100° C. was measured in accordance with the method of JIS K6300-1:2013.

A smaller index value of the Mooney viscosity indicates superior processability, but the index value is preferably 90 or greater.

Wet Grip Performance

A vulcanized rubber sheet was produced by press-vulcanizing each of the rubber compositions for tires (unvulcanized) obtained as described above for 20 minutes at 160° C. in a metal mold (15 cm×15 cm×0.2 cm).

The value of tan δ (0° C.) was measured for each of the produced vulcanized rubber sheets with an elongation deformation distortion of 10%±2%, a frequency of 20 Hz, and a temperature of 0° C. using a viscoelastic spectrometer (available from Toyo Seiki Seisaku-sho, Ltd.) in accordance with JIS 1(6394:2007.

In embodiments of the present invention, a larger index value of tan δ (0° C.) indicates a larger tan δ (0° C.) value and superior wet grip performance of a formed tire.

Low Rolling Resistance

The value of tan δ (60° C.) was measured by the same procedure as that for the wet grip performance described above except for measuring at a temperature of 60° C. instead of a temperature of 0° C.

In embodiments of the present invention, a smaller index value of tan δ (60° C.) indicates a smaller tan δ (60° C.) value and superior low rolling resistance of a formed tire.

Payne Effect

Each of the rubber compositions for tires produced as described above was vulcanized at 160° C. for 20 minutes. Using the obtained vulcanized rubber, the strain shear stress G'(0.28%) at a strain of 0.28% and the strain shear stress G'(450%) at a strain of 450% were measured in accordance with ASTM D6204 at 110° C. using the RPA 2000 (strain shear stress measurement instrument, available from Alpha Technologies), and then ΔG'=G'(0.28%)–G'(450%) was calculated.

In embodiments of the present invention, a smaller index value of ΔG' indicates better reduction or suppression of the Payne effect (better dispersibility of silane).

TABLE 1

| | Standard Example | Example 1 | Comparative Example 1 | Comparative Example 2 | Comparative Example 3 | Comparative Example 4 |
|---|---|---|---|---|---|---|
| SBR1 E580 | 110.0 | 110.0 | 110.0 | 110.0 | 110.0 | 110.0 |
| | 80.0 | 80.0 | 80.0 | 80.0 | 80.0 | 80.0 |
| BR 1220 | 20.0 | 20.0 | 20.0 | 20.0 | 20.0 | 20.0 |
| Silica 1 1165MP | 90.0 | 90.0 | 60.0 | 220.0 | 90.0 | 90.0 |
| Silica 2 200MP | | | | | | |
| Carbon black N339 | 5.0 | 5.0 | 5.0 | 5.0 | 5.0 | 5.0 |
| Silane coupling agent 1 Si 69 | 7.0 | 7.0 | 4.2 | 15.4 | 7.0 | 7.0 |
| Silane coupling agent 2 NXT | | | | | | |
| Zinc oxide | 3.0 | 3.0 | 3.0 | 3.0 | 3.0 | 3.0 |
| Stearic acid | 2.0 | 2.0 | 2.0 | 2.0 | 2.0 | 2.0 |
| Anti-aging agent | 1.5 | 1.5 | 1.5 | 1.5 | 1.5 | 1.5 |
| Process oil | 15.0 | 15.0 | 15.0 | 15.0 | 15.0 | 15.0 |
| Low molecular weight conjugated diene polymer (B-2000) | | | | | | |
| Modified low molecular weight conjugated diene polymer (ATB) | | | | | | |
| Piperazine compound 7 | | 5.0 | 5.0 | 5.0 | | |
| Morpholine compound 3 | | | | | | |
| Comparative piperazine compound 1 | | | | | | 5.0 |

TABLE 1-continued

|  | | | | | | |
|---|---|---|---|---|---|---|
| Comparative piperazine compound 2 |  |  |  |  |  | 5.0 |
| Sulfur | 1.4 | 1.4 | 1.4 | 1.4 | 1.4 | 1.4 |
| Vulcanization accelerator 1 | 1.7 | 1.7 | 1.7 | 1.7 | 1.7 | 1.7 |
| Vulcanization accelerator 2 | 0.4 | 0.4 | 0.4 | 0.4 | 0.4 | 0.4 |
| Average glass transition temperature of diene rubber (° C.) | −43 | −43 | −43 | −43 | −43 | −43 |
| Mooney viscosity | 100 | 93 | 86 | 108 | 97 | 100 |
| Low rolling resistance | 100 | 88 | 90 | 112 | 98 | 99 |
| Wet grip performance | 100 | 106 | 88 | 114 | 100 | 101 |
| Payne effect | 100 | 90 | 92 | 110 | 97 | 100 |

|  | Comparative Example 5 | Example 2 | Comparative Example 6 | Example 3 | Example 4 |
|---|---|---|---|---|---|
| SBR1 E580 | 110.0 | 110.0 | 110.0 | 110.0 | 110.0 |
|  | 80.0 | 80.0 | 80.0 | 80.0 | 80.0 |
| BR 1220 | 20.0 | 20.0 | 20.0 | 20.0 | 20.0 |
| Silica 1 1165MP | 90.0 | 90.0 | 90.0 | 90.0 | 90.0 |
| Silica 2 200MP |  |  |  |  |  |
| Carbon black N339 | 5.0 | 5.0 | 5.0 | 5.0 | 5.0 |
| Silane coupling agent 1 Si 69 | 7.0 | 7.0 | 7.0 | 7.0 | 7.0 |
| Silane coupling agent 2 NXT |  |  |  |  |  |
| Zinc oxide | 3.0 | 3.0 | 3.0 | 3.0 | 3.0 |
| Stearic acid | 2.0 | 2.0 | 2.0 | 2.0 | 2.0 |
| Anti-aging agent | 1.5 | 1.5 | 1.5 | 1.5 | 1.5 |
| Process oil |  |  |  |  | 15.0 |
| Low molecular weight conjugated diene polymer (B-2000) | 15.0 | 15.0 |  |  |  |
| Modified low molecular weight conjugated diene polymer (ATB) |  |  | 15.0 | 15.0 |  |
| Piperazine compound 7 |  | 5.0 |  | 5.0 |  |
| Morpholine compound 3 |  |  |  |  | 5.0 |
| Comparative piperazine compound 1 |  |  |  |  |  |
| Comparative piperazine compound 2 |  |  |  |  |  |
| Sulfur | 1.4 | 1.4 | 1.4 | 1.4 | 1.4 |
| Vulcanization accelerator 1 | 1.7 | 1.7 | 1.7 | 1.7 | 1.7 |
| Vulcanization accelerator 2 | 0.4 | 0.4 | 0.4 | 0.4 | 0.4 |
| Average glass transition temperature of diene rubber (° C.) | −43 | −43 | −43 | −43 | −43 |
| Mooney viscosity | 110 | 90 | 96 | 92 | 96 |
| Low rolling resistance | 102 | 94 | 96 | 86 | 96 |
| Wet grip performance | 87 | 101 | 95 | 102 | 101 |
| Payne effect | 110 | 87 | 96 | 86 | 93 |

TABLE 2

|  | Standard Example | Example 1 | Comparative Example 1 | Comparative Example 2 | Comparative Example 3 | Comparative Example 4 |
|---|---|---|---|---|---|---|
| SBR1 E580 | 110.0 | 110.0 | 110.0 | 110.0 | 110.0 | 110.0 |
|  | 80.0 | 80.0 | 80.0 | 80.0 | 80.0 | 80.0 |
| BR 1220 | 20.0 | 20.0 | 20.0 | 20.0 | 20.0 | 20.0 |
| Silica 1 1165MP |  |  |  |  |  |  |
| Silica 2 200MP | 120.0 | 120.0 | 60.0 | 220.0 | 120.0 | 120.0 |
| Carbon black N339 | 5.0 | 5.0 | 5.0 | 5.0 | 5.0 | 5.0 |
| Silane coupling agent 1 Si 69 |  |  |  |  |  |  |
| Silane coupling agent 2 NXT | 12.0 | 12.0 | 12.0 | 12.0 | 12.0 | 12.0 |
| Zinc oxide | 3.0 | 3.0 | 3.0 | 3.0 | 3.0 | 3.0 |
| Stearic acid | 2.0 | 2.0 | 2.0 | 2.0 | 2.0 | 2.0 |
| Anti-aging agent | 1.5 | 1.5 | 1.5 | 1.5 | 1.5 | 1.5 |
| Process oil | 15.0 | 15.0 | 15.0 | 15.0 | 15.0 | 15.0 |
| Low molecular weight conjugated diene polymer (B-2000) |  |  |  |  |  |  |
| Modified low molecular weight conjugated diene polymer (ATB) |  |  |  |  |  |  |
| Piperazine compound 7 |  | 5.0 | 5.0 | 5.0 |  |  |
| Morpholine compound 3 |  |  |  |  |  |  |
| Comparative piperazine compound 1 |  |  |  |  | 5.0 |  |

TABLE 2-continued

|  | | | | | | |
|---|---|---|---|---|---|---|
| Comparative piperazine compound 2 | | | | | | 5.0 |
| Sulfur | 1.4 | 1.4 | 1.4 | 1.4 | 1.4 | 1.4 |
| Vulcanization accelerator 1 | 1.7 | 1.7 | 1.7 | 1.7 | 1.7 | 1.7 |
| Vulcanization accelerator 2 | 0.4 | 0.4 | 0.4 | 0.4 | 0.4 | 0.4 |
| Average glass transition temperature of diene rubber (° C.) | −43 | −43 | −43 | −43 | −43 | −43 |
| Mooney viscosity | 100 | 93 | 87 | 110 | 97 | 100 |
| Low rolling resistance | 100 | 91 | 90 | 111 | 98 | 99 |
| Wet grip performance | 100 | 102 | 84 | 118 | 100 | 101 |
| Payne effect | 100 | 93 | 90 | 111 | 97 | 100 |

|  | Comparative Example 5 | Example 2 | Comparative Example 6 | Example 3 | Example 4 |
|---|---|---|---|---|---|
| SBR1 E580 | 110.0 | 110.0 | 110.0 | 110.0 | 110.0 |
|  | 80.0 | 80.0 | 80.0 | 80.0 | 80.0 |
| BR 1220 | 20.0 | 20.0 | 20.0 | 20.0 | 20.0 |
| Silica 1 1165MP |  |  |  |  |  |
| Silica 2 200MP | 100.0 | 100.0 | 100.0 | 100.0 | 120 |
| Carbon black N339 | 5.0 | 5.0 | 5.0 | 5.0 | 5.0 |
| Silane coupling agent 1 Si 69 |  |  | 7.0 |  | 7.0 |
| Silane coupling agent 2 NXT | 12.0 | 10.0 |  | 10.0 |  |
| Zinc oxide | 3.0 | 3.0 | 3.0 | 3.0 | 3.0 |
| Stearic acid | 2.0 | 2.0 | 2.0 | 2.0 | 2.0 |
| Anti-aging agent | 1.5 | 1.5 | 1.5 | 1.5 | 1.5 |
| Process oil |  |  |  |  | 15.0 |
| Low molecular weight conjugated diene polymer (B-2000) | 15.0 | 15.0 |  |  |  |
| Modified low molecular weight conjugated diene polymer (ATB) |  |  | 15.0 | 15.0 |  |
| Piperazine compound 7 |  | 5.0 |  | 5.0 |  |
| Morpholine compound 3 |  |  |  |  | 5.0 |
| Comparative piperazine compound 1 |  |  |  |  |  |
| Comparative piperazine compound 2 |  |  |  |  |  |
| Sulfur | 1.4 | 1.4 | 1.4 | 1.4 | 1.4 |
| Vulcanization accelerator 1 | 1.7 | 1.7 | 1.7 | 1.7 | 1.7 |
| Vulcanization accelerator 2 | 0.4 | 0.4 | 0.4 | 0.4 | 0.4 |
| Average glass transition temperature of diene rubber (° C.) | −43 | −43 | −43 | −43 | −43 |
| Mooney viscosity | 96 | 90 | 96 | 88 | 96 |
| Low rolling resistance | 101 | 94 | 96 | 86 | 96 |
| Wet grip performance | 89 | 101 | 95 | 102 | 101 |
| Payne effect | 93 | 90 | 96 | 86 | 93 |

TABLE 3

|  | Standard Example | Example 1 | Comparative Example 1 | Comparative Example 2 | Comparative Example 3 | Comparative Example 4 |
|---|---|---|---|---|---|---|
| SBR2 Nipol NS522 | 110.0 | 110.0 | 110.0 | 110.0 | 110.0 | 110.0 |
|  | 80.0 | 80.0 | 80.0 | 80.0 | 80.0 | 80.0 |
| BR 1220 | 20.0 | 20.0 | 20.0 | 20.0 | 20.0 | 20.0 |
| Silica 1 1165MP | 90.0 | 90.0 | 60.0 | 220.0 | 90.0 | 90.0 |
| Silica 2 200MP |  |  |  |  |  |  |
| Carbon black N339 | 5.0 | 5.0 | 5.0 | 5.0 | 5.0 | 5.0 |
| Silane coupling agent 1 Si 69 | 7.0 | 7.0 | 4.2 | 15.4 | 7.0 | 7.0 |
| Silane coupling agent 2 NXT |  |  |  |  |  |  |
| Zinc oxide | 3.0 | 3.0 | 3.0 | 3.0 | 3.0 | 3.0 |
| Stearic acid | 2.0 | 2.0 | 2.0 | 2.0 | 2.0 | 2.0 |
| Anti-aging agent | 1.5 | 1.5 | 1.5 | 1.5 | 1.5 | 1.5 |

TABLE 3-continued

| | | | | | | |
|---|---|---|---|---|---|---|
| Process oil | 15.0 | 15.0 | 15.0 | 15.0 | 15.0 | 15.0 |
| Low molecular weight conjugated diene polymer (B-2000) | | | | | | |
| Modified low molecular weight conjugated diene polymer (ATB) | | | | | | |
| Piperazine compound 7 | | 5.0 | 5.0 | 5.0 | | |
| Morpholine compound 3 | | | | | | |
| Comparative piperazine compound 1 | | | | | 5.0 | |
| Comparative piperazine compound 2 | | | | | | 5.0 |
| Sulfur | 1.4 | 1.4 | 1.4 | 1.4 | 1.4 | 1.4 |
| Vulcanization accelerator 1 | 1.7 | 1.7 | 1.7 | 1.7 | 1.7 | 1.7 |
| Vulcanization accelerator 2 | 0.4 | 0.4 | 0.4 | 0.4 | 0.4 | 0.4 |
| Average glass transition temperature of diene rubber (° C.) | −39.4 | −39.4 | −39.4 | −39.4 | −39.4 | −39.4 |
| Mooney viscosity | 100 | 93 | 87 | 110 | 103 | 110 |
| Low rolling resistance | 100 | 91 | 90 | 111 | 86 | 101 |
| Wet grip performance | 100 | 102 | 84 | 118 | 99 | 89 |
| Payne effect | 100 | 93 | 90 | 111 | 86 | 93 |

| | Comparative Example 5 | Example 2 | Comparative Example 6 | Example 3 | Example 4 |
|---|---|---|---|---|---|
| SBR2 Nipol NS522 | 110.0 | 110.0 | 110.0 | 110.0 | 110.0 |
| | 80.0 | 80.0 | 80.0 | 80.0 | 80.0 |
| BR 1220 | 20.0 | 20.0 | 20.0 | 20.0 | 20.0 |
| Silica 1 1165MP | 90.0 | 90.0 | 90.0 | 90.0 | 90.0 |
| Silica 2 200MP | | | | | |
| Carbon black N339 | 5.0 | 5.0 | 5.0 | 5.0 | 5.0 |
| Silane coupling agent 1 Si 69 | 7.0 | 7.0 | 7.0 | 7.0 | 7.0 |
| Silane coupling agent 2 NXT | | | | | |
| Zinc oxide | 3.0 | 3.0 | 3.0 | 3.0 | 3.0 |
| Stearic acid | 2.0 | 2.0 | 2.0 | 2.0 | 2.0 |
| Anti-aging agent | 1.5 | 1.5 | 1.5 | 1.5 | 1.5 |
| Process oil | | | | | 15.0 |
| Low molecular weight conjugated diene polymer (B-2000) | 15.0 | 15.0 | | | |
| Modified low molecular weight conjugated diene polymer (ATB) | | | 15.0 | 15.0 | |
| Piperazine compound 7 | | 5.0 | | 5.0 | |
| Morpholine compound 3 | | | | | 5.0 |
| Comparative piperazine compound 1 | | | | | |
| Comparative piperazine compound 2 | | | | | |
| Sulfur | 1.4 | 1.4 | 1.4 | 1.4 | 1.4 |
| Vulcanization accelerator 1 | 1.7 | 1.7 | 1.7 | 1.7 | 1.7 |
| Vulcanization accelerator 2 | 0.4 | 0.4 | 0.4 | 0.4 | 0.4 |
| Average glass transition temperature of diene rubber (° C.) | −39.4 | −39.4 | −39.4 | −39.4 | −39.4 |
| Mooney viscosity | 96 | 91 | 96 | 90 | 96 |
| Low rolling resistance | 101 | 95 | 96 | 94 | 96 |
| Wet grip performance | 89 | 102 | 95 | 103 | 101 |
| Payne effect | 93 | 95 | 96 | 90 | 93 |

The details of each component shown in each table above are as follows.

SBR 1: Solution-polymerized styrene butadiene rubber having a hydroxy group as a terminal-modification group for silica. The SBR1 corresponds to the diene rubber. Tufdene E580 (oil-extended product (37.5 parts by mass of extender oil was contained per 100 parts by mass of SBR; the net amount of SBR in the SBR 1 was 72.7% by mass); styrene content: 37% by mass; vinyl bond content: 42%; Tg: -27° C.; weight average molecular weight: 1260000; available from Asahi Kasei Corporation) Since the SBR 1 is a styrene butadiene rubber having a hydroxy group as a terminal-modification group for silica, the SBR 1 can interact or react with silica at the modification group.

SBR2: Styrene butadiene rubber. The SBR2 corresponds to the diene rubber. Trade name: Nipol NS522 (oil-extended product (37.5 parts by mass of extender oil was contained per 100 parts by mass of SBR; the net amount of SBR in the SBR 2 was 72.7% by mass); styrene content: 39% by mass; vinyl bond content: 41%; Tg: −23° C.; weight average molecular weight: 1360000; available from Zeon Corporation) Note that the SBR2 does not have a modification group.

BR: Butadiene rubber, Nipol 1220 (butadiene rubber, available from Zeon Corporation), Tg: −105° C. The BR corresponds to the diene rubber. The BR does not have a modification group.

Silica 1: Zeosil 1165MP (CTAB adsorption specific surface area: 159 $m^2$/g, available from Rhodia)

Silica 2: Zeosil PREMIUM 200MP, available from Rhodia; CTAB adsorption specific surface area: 200 $m^2$/g Carbon black: SEAST KH N339 ($N_2$SA: 93 $m^2$/g, available from Tokai Carbon Co., Ltd.)

Silane coupling agent 1: Si69 (bis(3-triethoxysilylpropyl) tetrasulfide, available from Evonik Degussa Corporation)

Silane coupling agent 2: NXT (3-octanoylthio-1-propyl-triethoxysilane, available from Momentive Performance)

Zinc oxide: Zinc Oxide III (available from Seido Chemical Industry Co., Ltd.)

Stearic acid: Beads stearic acid YR (available from NOF Corporation)

Anti-aging agent: 6PPD (available from Flexsys)

Process oil: Extract No. 4S (available from Showa Shell Sekiyu K.K.)

Low molecular weight conjugated diene polymer (B-2000): Liquid butadiene rubber; trade name: B-2000, available from Nippon Soda Co., Ltd.; weight average molecular weight: 2100; vinyl bond content: 90%

Modified low molecular weight conjugated diene polymer (ATB): Modified liquid butadiene rubber having a terminal amine group; trade name: Hypro 2000X173, available from Emerald Performance Materials, LLC; weight average molecular weight: 4000; vinyl bond content: 23%

Piperazine compound 7: Piperazine compound 7 synthesized as described above

Morpholine compound 3: Morpholine compound 3 synthesized as described above

Comparative piperazine compound 1: Hydroxyethyl piperazine, 1-(2-hydroxyethyl)piperazine, available from Nippon Nyukazai Co., Ltd.

Comparative piperazine compound 2: reagent [3-(1-piperazinyepropyl]triethoxysilane. The comparative piperazine compound 2 has a silicon atom.

Sulfur: "Golden Flower" oil-treated sulfur powder (available from Tsurumi Chemical Industry Co., Ltd.)

Vulcanization accelerator 1: NOCCELER CZ-G (vulcanization accelerator CBS, available from Ouchi Shinko Chemical Industrial Co., Ltd.)

Vulcanization accelerator 2: NOCCELER D (vulcanization accelerator DPG, available from Ouchi Shinko Chemical Industrial Co., Ltd.)

As is clear from the results shown in Table 1, Comparative Example 1, in which the content of silica was less than the predetermined range, exhibited inferior wet grip performance compared to that of Standard Example.

Comparative Example 2, in which the content of silica was greater than the predetermined range, exhibited inferior processability and low rolling resistance compared to those of Standard Example.

Comparative Example 3, which contained no predetermined heterocyclic compound and contained the piperazine compound having a hydroxyethyl group instead, exhibited approximately the same degree of wet grip performance as that of Standard Example.

Comparative Example 4, which contained no predetermined heterocyclic compound and contained the piperazine compound having a silicon atom instead, exhibited approximately the same degree of processability as that of Standard Example.

Comparative Example 5, which further contained the low molecular weight conjugated diene polymer that may have been modified but contained no predetermined heterocyclic compound, exhibited inferior processability, low rolling resistance, and wet grip performance compared to those of Standard Example.

Comparative Example 6, which further contained the low molecular weight conjugated diene polymer that may have been modified but contained no predetermined heterocyclic compound, exhibited inferior wet grip performance compared to that of Standard Example.

In contrast to these, the compositions according to embodiments of the present invention (Examples 1 to 4) exhibited superior processability, wet grip performance, and low rolling resistance compared to those of Standard Example.

Furthermore, the composition according to an embodiment of the present invention (Example 2) exhibited superior processability, wet grip performance, and low rolling resistance compared to those of Comparative Example 5 which contained no predetermined heterocyclic compound.

The composition according to an embodiment of the present invention (Example 3) exhibited superior processability, wet grip performance, and low rolling resistance compared to those of Comparative Example 6 which contained no predetermined heterocyclic compound.

As is clear from the results shown in Table 2, Comparative Example 1, in which the content of silica was less than the predetermined range, exhibited inferior wet grip performance compared to that of Standard Example.

Comparative Example 2, in which the content of silica was greater than the predetermined range, exhibited inferior processability and low rolling resistance compared to those of Standard Example.

Comparative Example 3, which contained no predetermined heterocyclic compound, and contained the piperazine compound having a hydroxyethyl group instead, exhibited approximately the same degree of wet grip performance as that of Standard Example.

Comparative Example 4, which contained no predetermined heterocyclic compound, and contained the piperazine compound having a silicon atom instead, exhibited approximately the same degree of processability as that of Standard Example.

Comparative Example 5, which further contained the low molecular weight conjugated diene polymer that may have been modified but contained no predetermined heterocyclic compound, exhibited inferior low rolling resistance and wet grip performance compared to those of Standard Example.

Comparative Example 6, which further contained the low molecular weight conjugated diene polymer that may have been modified but contained no predetermined heterocyclic compound, exhibited inferior wet grip performance compared to that of Standard Example.

In contrast to these, the compositions according to embodiments of the present invention (Examples 1 to 4) exhibited superior processability, wet grip performance, and low rolling resistance compared to those of Standard Example.

Furthermore, the composition according to an embodiment of the present invention (Example 2) exhibited superior processability, wet grip performance, and low rolling resistance compared to those of Comparative Example 5 which contained no predetermined heterocyclic compound.

The composition according to an embodiment of the present invention (Example 3) exhibited superior processability, wet grip performance, and low rolling resistance compared to those of Comparative Example 6 which contained no predetermined heterocyclic compound.

As is clear from the results shown in Table 3, Comparative Example 1, in which the content of silica was less than the predetermined range, exhibited inferior wet grip performance compared to that of Standard Example.

Comparative Example 2, in which the content of silica was greater than the predetermined range, exhibited inferior processability and low rolling resistance compared to those of Standard Example.

Comparative Example 3, which contained no predetermined heterocyclic compound, and contained the piperazine compound having a hydroxyethyl group instead, exhibited inferior processability and wet grip performance compared to those of Standard Example.

Comparative Example 4, which contained no predetermined heterocyclic compound, and contained the piperazine compound having a silicon atom instead, exhibited inferior processability, low rolling resistance, and wet grip performance.

Comparative Example 5, which further contained the low molecular weight conjugated diene polymer that may have been modified but contained no predetermined heterocyclic compound, exhibited inferior low rolling resistance and wet grip performance compared to those of Standard Example.

Comparative Example 6, which further contained the low molecular weight conjugated diene polymer that may have been modified but contained no predetermined heterocyclic compound, exhibited inferior wet grip performance compared to that of Standard Example.

In contrast to these, the compositions according to embodiments of the present invention (Examples 1 to 4) exhibited superior processability, wet grip performance, and low rolling resistance compared to those of Standard Example.

Furthermore, the composition according to an embodiment of the present invention (Example 2) exhibited superior processability, wet grip performance, and low rolling resistance compared to those of Comparative Example 5 which contained no predetermined heterocyclic compound.

The composition according to an embodiment of the present invention (Example 3) exhibited superior processability, wet grip performance, and low rolling resistance compared to those of Comparative Example 6 which contained no predetermined heterocyclic compound.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:
1. A rubber composition for a tire, the rubber composition comprising:
  a diene rubber;
  silica; and
  a heterocyclic compound where, the heterocyclic compound does not have a silicon atom, having a monovalent hydrocarbon group having from 3 to 30 carbons and at least one type of heterocycle selected from the group consisting of a piperazine ring, a morpholine ring, and a thiomorpholine ring,
  wherein the heterocyclic compound is a compound represented by Formula (I) below:

[Formula 1]

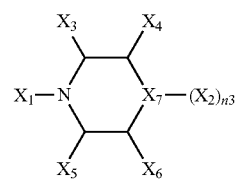

(I)

in Formula (I), $X_7$ represents at least one type selected from the group consisting of a nitrogen atom, an oxygen atom, and a sulfur atom,
  $X_3$, $X_4$, $X_5$ and $X_6$ each independently represent a hydrogen atom or a hydrocarbon group,
  when $X_7$ is a nitrogen atom, n3 is 1, and one or both of $X_1$ and $X_2$ each independently represent Formula (I-1): $-(A_1)_{n1-1}-R_{1-1}$,
  when only one of $X_1$ and $X_2$ represents Formula (I-1), the remaining group represents at least one type selected from the group consisting of a hydrogen atom, a sulfone-based protecting group, a carbamate-based protecting group, and Formula (I-3): $-(R_2-O)_{n2}-H$
  in Formula (I-3), $R_2$ each independently represents a divalent hydrocarbon group, and
  n2 represents from 1 to 10, or
  when $X_7$ is at least one type selected from the group consisting of an oxygen atom and a sulfur atom, n3 represents 0, and $X_1$ represents Formula (I-1): $-(A_1)_{n1-1}-R_{1-1}$,
  in Formula (I-1), $A_1$ represents at least one type selected from the group consisting of a carbonyl group and Formula (I-2): $-R_{1-2}(OH)-O-$,
  n1-1 represents 1, $R_{1-1}$ represents the monovalent hydrocarbon group having from 3 to 30 carbons, and in Formula (I-2), $R_{1-2}$ represents a trivalent hydrocarbon group, an average glass transition temperature of the diene rubber being −50° C. or higher, a content of the silica being from 80 to 200 parts by mass per 100 parts by mass of the diene rubber, and a content of the heterocyclic compound being from 0.5 to 20% by mass with respect to the content of the silica.

2. The rubber composition for a tire according to claim 1, wherein the heterocyclic compound is a compound represented by Formula (I), where $X_7$ is a nitrogen atom, n3 is 1, and both of $X_1$ and $X_2$ each independently represent Formula (I-1).

3. The rubber composition for a tire according to claim 2, wherein the silica has a CTAB adsorption specific surface area of 150 to 300 m2/g.

4. The rubber composition for a tire according to claim 2, the rubber composition further comprising a silane coupling agent.

5. The rubber composition for a tire according to claim 2, wherein the diene rubber contains a modified diene rubber, and a content of the modified diene rubber is greater than 50% by mass with respect to a total amount of the diene rubber.

6. The rubber composition for a tire according to claim 2, the rubber composition further comprising a low molecular weight conjugated diene polymer that has a weight average molecular weight of 1000 to 30000 and that may be modified, a content of the low molecular weight conjugated diene polymer being from 5 to 30 parts by mass per 100 parts by mass of the diene rubber.

7. The rubber composition for a tire according to claim 1, wherein the heterocyclic compound is a compound represented by Formula (I), where $X_7$ is a nitrogen atom, and n3 is 1, only one of $X_1$ and $X_2$ represents Formula (I-1), the remaining groups represents at least one type selected from the group consisting of a hydrogen atom, a sulfone-based protecting group, a carbamate-based protecting group, and Formula (I-3): $-(R_2-O)_{n2}-H$, in Formula (I-3), $R_2$ each independently represents a divalent hydrocarbon group, and n2 represents from 1 to 10.

8. The rubber composition for a tire according to claim 1, wherein the silica has a CTAB adsorption specific surface area of 150 to 300 m²/g.

9. The rubber composition for a tire according to claim 8, the rubber composition further comprising a silane coupling agent.

10. The rubber composition for a tire according to claim 8, wherein the diene rubber contains a modified diene rubber, and a content of the modified diene rubber is greater than 50% by mass with respect to a total amount of the diene rubber.

11. The rubber composition for a tire according to claim 8, the rubber composition further comprising a low molecular weight conjugated diene polymer that has a weight average molecular weight of 1000 to 30000 and that may be modified, a content of the low molecular weight conjugated diene polymer being from 5 to 30 parts by mass per 100 parts by mass of the diene rubber.

12. The rubber composition for a tire according to claim 1, the rubber composition further comprising a silane coupling agent.

13. The rubber composition for a tire according to claim 1, wherein the diene rubber contains a modified diene rubber, and a content of the modified diene rubber is greater than 50% by mass with respect to a total amount of the diene rubber.

14. The rubber composition for a tire according to claim 1, the rubber composition further comprising a low molecular weight conjugated diene polymer that has a weight average molecular weight of 1000 to 30000 and that may be modified, a content of the low molecular weight conjugated diene polymer being from 5 to 30 parts by mass per 100 parts by mass of the diene rubber.

15. A pneumatic tire comprising the rubber composition for a tire described in claim 1 in a cap tread.

* * * * *